(12) United States Patent
Zhang et al.

(10) Patent No.: US 10,897,293 B2
(45) Date of Patent: *Jan. 19, 2021

(54) METHOD FOR DETERMINING PRECODING MATRIX SET AND TRANSMISSION APPARATUS

(71) Applicant: HUAWEI TECHNOLOGIES CO., LTD., Guangdong (CN)

(72) Inventors: Ruiqi Zhang, Beijing (CN); Xueru Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/559,354

(22) Filed: Sep. 3, 2019

(65) Prior Publication Data

US 2019/0393941 A1    Dec. 26, 2019

Related U.S. Application Data

(63) Continuation of application No. 16/375,312, filed on Apr. 4, 2019, now Pat. No. 10,476,568, which is a
(Continued)

(30) Foreign Application Priority Data

Aug. 12, 2017    (CN) .......................... 2017 1 0687817

(51) Int. Cl.
*H04W 4/00*    (2018.01)
*H04B 7/0456*    (2017.01)
(Continued)

(52) U.S. Cl.
CPC ......... *H04B 7/0486* (2013.01); *H04B 7/0417* (2013.01); *H04B 7/0478* (2013.01);
(Continued)

(58) Field of Classification Search
None
See application file for complete search history.

(56) References Cited

U.S. PATENT DOCUMENTS

2008/0260059 A1    10/2008  Pan
2010/0284484 A1    11/2010  Jöngren et al.
(Continued)

FOREIGN PATENT DOCUMENTS

CN    101843005 A    9/2010
CN    101911525       12/2010
(Continued)

OTHER PUBLICATIONS

3GPP TS 36-213 V14.3.0 (Jun. 2017),3rd Generation Partnership Project;Technical Specification Group Radio Access Network;Evolved Universal Terrestrial Radio Access (E-UTRA);Physical layer procedures(Release 14),total 460 pages.
(Continued)

*Primary Examiner* — Bob A Phunkulh
(74) *Attorney, Agent, or Firm* — Fish & Richardson P.C.

(57) ABSTRACT

This application provides a method for determining a precoding matrix set, so as to avoid a case in which a relatively large quantity of precoding matrices in a precoding matrix set cannot be used, thereby improving system performance. A terminal device receives indication information from a network device, and determines a second precoding matrix set front a first precoding matrix set whose rank is R based on the indication information. Each precoding matrix W in the first precoding matrix set satisfies $W=W_1 \times W_2$, the second precoding matrix set is a proper subset of the first precoding matrix set, and the second precoding matrix set does not include $W=W_1 \times W_2$ that satisfies the specific condition in the first precoding matrix set.

19 Claims, 3 Drawing Sheets

Related U.S. Application Data continuation of application No. PCT/CN2018/094446, filed on Jul. 4, 2018.

(51) Int. Cl.
*H04B 7/06* (2006.01)
*H04B 7/0417* (2017.01)
*H04L 1/00* (2006.01)
*H04L 5/00* (2006.01)
*H04B 7/0426* (2017.01)

(52) U.S. Cl.
CPC ......... *H04B 7/0482* (2013.01); *H04B 7/0639* (2013.01); *H04L 1/0026* (2013.01); *H04L 5/0051* (2013.01); *H04B 7/0426* (2013.01); *H04B 7/0469* (2013.01); *H04B 7/0695* (2013.01); *H04L 5/0007* (2013.01)

(56) References Cited

U.S. PATENT DOCUMENTS

| | | |
|---|---|---|
| 2010/0322176 A1 | 12/2010 | Chen et al. |
| 2011/0081901 A1 | 4/2011 | Moulsley et al. |
| 2013/0094464 A1 | 4/2013 | Li et al. |
| 2013/0268628 A1 | 10/2013 | Zhu et al. |
| 2014/0029689 A1 | 1/2014 | Liu et al. |
| 2014/0036815 A1 | 2/2014 | Lei et al. |
| 2014/0044211 A1 | 2/2014 | Hammarwall et al. |
| 2016/0087701 A1 | 3/2016 | Wu et al. |
| 2016/0127018 A1 | 5/2016 | Nammi et al. |
| 2016/0149630 A1 | 5/2016 | Liu |
| 2016/0294454 A1 | 10/2016 | Onggosanusi et al. |
| 2016/0373175 A1 | 12/2016 | Harrison et al. |
| 2017/0047980 A1 | 2/2017 | Dong |
| 2017/0180020 A1 | 6/2017 | Namgoong et al. |
| 2017/0257868 A1 | 9/2017 | Wang et al. |
| 2018/0097553 A1 | 4/2018 | Wang et al. |
| 2018/0219603 A1 | 8/2018 | Park et al. |
| 2018/0287749 A1 | 10/2018 | Chen et al. |
| 2018/0294847 A1 | 10/2018 | Lee et al. |
| 2019/0028158 A1 | 1/2019 | Park et al. |

FOREIGN PATENT DOCUMENTS

| | | |
|---|---|---|
| CN | 102957467 | 3/2013 |
| CN | 104144006 | 11/2014 |
| CN | 104620527 | 5/2015 |
| CN | 106603136 A | 4/2017 |
| CN | 106936485 A | 7/2017 |
| CN | 109391436 A | 2/2019 |
| CN | 109245875 B | 9/2019 |
| CN | 109361498 B | 9/2019 |
| EP | 3468094 A1 | 4/2019 |
| JP | 2016518789 A | 6/2016 |
| JP | 2017509230 A | 3/2017 |
| WO | WO2017054192 A1 | 4/2017 |

OTHER PUBLICATIONS

3GPP TS 38.214 V0.0. 1 (Jul. 2017),3rd Generation Partnership Project;Technical Specification Group Radio AccessNetwork;NR;Physical layer procedures for data(Release 15),total 30 pages.

Extended European Search Report issued in European Application No. 18807542.8 dated May 28, 2019, 5 pages.

International Search Report and Written Opinion issued in International Application No. PCT/CN2018/094446 dated Sep. 12, 2018, 12 pages.

Issue Notification issued in Chinese Application No. 201811292412.1 dated Jul. 18, 2019, 3 pages.

Ji, ""Peak-to-Average Power Ratio Reduction Techniques in OFDMISC-FDMA Systems,"" Xidian University of Electronic Science and Technology, Communication and Information Systems, Dec. 2014, 141 pages.

Notice of Allowance issued in Chinese Application No. 201811292412.1 dated Jul. 18, 2019, 1 page.

Office Action issued in Chinese Application No. 201811292412.1 dated May 24, 2019, 7 pages.

Office Action issued in Chinese Application No. 201811292585.3 dated Jun. 14, 2019, 6 pages.

R1-1701748 Huawei, HiSilicon,""Details of CSI reporting for advanced CSI"",3GPP TSG RAN WG1 Meeting #88, Athens, Greece, Feb. 13-17, 2017,total 7 pages.

R1-1709232—Samsung el al.,"WF on Type I and II CSI codebooks," 3GPP TSG-RAN WG1 #89, Hangzhou, China, May 15-19, 2017, 24 pages.

R1-1711028—Ericsson, "Codebook Subset Restriction" 3GPP TSG RAN WG1 NR Ad-Hoc#2, Qingdao, P.R. China, Jun. 27-30, 2017, 3 pages.

R1-1713776 Huawei, HiSilicon,"Codebook Subset Restriction",3GPP TSG RAN WG1 Meeting #90,Prague, Czech Republic, Aug. 21-25, 2017,total 4 pages.

R1-1715594 Huawei, HiSilicon,""Codebook Subset Restriction"",3GPP TSG RAN WG1 Meeting AH NR#3,Nagoya, Japan, Sep. 18-21, 2017,total 11 pages.

Office Action issued in Chinese Application No. 201880047058.8 dated Aug. 4, 2020, 10 pages (with English translation).

Intel Corporation, "Discussion on NR codebook design," 3GPP TSG-RAN WG1 #87, R1-1611983, Reno, USA Nov. 14-18, 2016, 9 pages.

Office Action issued in Japanese Application No. 2019-543855 dated Nov. 9, 2020, 6 pages (with English translation).

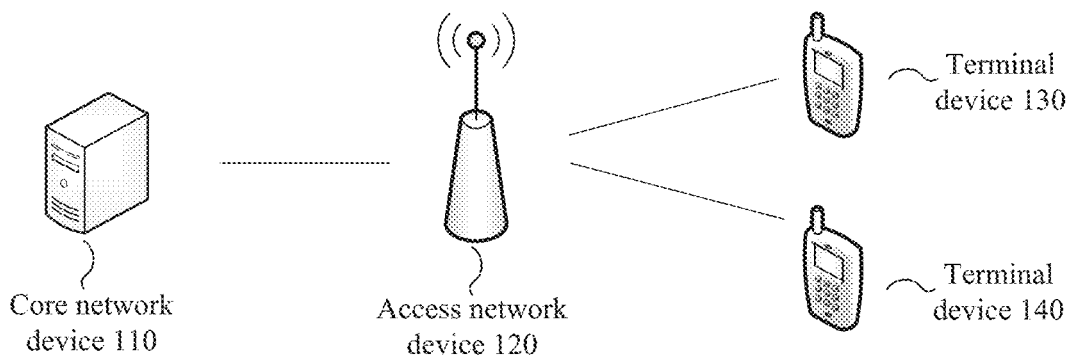

A network device sends indication information to a terminal, where the indication information includes indication information of S sets $D_0$ to $D_{S-1}$, $D_0$ to $D_{S-1}$ are respectively in one-to-one correspondence with $C_0$ to $C_{S-1}$, any vector in C belongs to B, $D_j$ is a proper subset of $A_0$, $S - 1 \geq j \geq 0$, and j is an integer ⸺ S210

The terminal device determines, based on the indication information, a second precoding matrix set from a first precoding matrix set whose rank is R ⸺ S220

The network device sends a CSI-RS to the terminal device ⸺ S230

The terminal device determines a channel matrix based on the CSI-RS, and determines, based on the channel matrix, a first PMI used to indicate $W_1$ and a second PMI used to indicate $W_2$ ⸺ S240

FIG. 2

METHOD FOR DETERMINING PRECODING MATRIX SET AND TRANSMISSION APPARATUS

CROSS-REFERENCE TO RELATED APPLICATIONS

This application is a continuation of U.S. patent application Ser. No. 16/375,312, filed on Apr. 4, 2019, which is a continuation of International Application No. PCT/CN2018/094446, filed on Jul. 4, 2018. The international Application claims priority to Chinese Patent Application No. 201710687817.4, filed on Aug. 12, 2017. All of the aforementioned patent applications are hereby incorporated by reference in their entireties.

TECHNICAL FIELD

This application relates to the communications field, and more specifically, to a method for determining a precoding matrix set and a transmission apparatus.

BACKGROUND

A manner of restricting a precoding matrix subset in a Long Term Evolution (LTE) system is restricting vectors that can be selected for $W_1$. To be specific, a network device notifies a terminal of vectors that can be used by the terminal. If a specific vector is restricted, for example, a first vector is restricted, the first vector cannot appear in $W_1$ when the terminal selects a precoding matrix. However, because vectors close to the first vector have relatively strong energy in a direction of the first vector, the network device usually cannot restrict use of only the first vector but also needs to restrict the vectors close to the first vector. If a prior-art method is used, vectors close to (or near) the first vector cannot appear in $W_1$, either. In this case, a relatively large quantity of precoding matrices cannot be used, and consequently, system performance deteriorates.

In the New Radio Access Technology (NR), a type II precoding matrix is defined: $W = W_1 \times W_2$. Currently, no technology is related to a solution for restricting a precoding matrix subset of the Type II precoding matrix $W = W_1 \times W_2$. However, if the manner of restricting a precoding matrix in the LTE system is used, a relatively large quantity of precoding matrices cannot be used, and consequently, system performance deteriorates.

SUMMARY

This application provides a method for determining a precoding matrix set, so as to avoid a case in which a relatively large quantity of precoding matrices in a precoding matrix set cannot be used, thereby improving system performance.

According to a first aspect, a method for determining a precoding matrix set is provided, including:

receiving, by a terminal device, indication information; and determining, by the terminal device based on the indication information, a second precoding matrix set from a first precoding matrix set whose rank is R, where each precoding matrix W in the first precoding matrix set satisfies $W = W_1 \times W_2$, W is a matrix of $N_t$ rows and R columns, $N_t$ is greater than or equal to R, $W_1$ satisfies $$W_1 = \begin{bmatrix} X & 0 \\ 0 & X \end{bmatrix},$$

$X = [b_{k_0} \ldots b_{k_{M-1}}]$, $b_{k_i}$ is an $N_t/2 \times 1$ vector, $b_{k_i}$ belongs to a vector set $B = \{b_0, b_1, \ldots, b_{T-1}\}$, T is a quantity of vectors in B, $T \geq M$, T is an integer, $W_2$ is a matrix of 2M rows and R columns, an element $W_2(x,y)$ in row x and column y of $W_2$ satisfies $W_2(x,y) = p_{0,y-1,x-1}^0 \times p_{0,y-1,x-1}^1 \times p_{0,y-1,x-1}^2$, an element $W_2(x+M,y)$ in row x+M and column y of $W_2$ satisfies $W_2(x+M,y) = p_{1,y-1,x-1}^0 \times p_{1,y-1,x-1}^1 \times p_{1,y-1,x-1}^2$, $p_{z,y-1,x-1}^0$ is a first product factor, $p_{z,y-1,x-1}^1$ is a second product factor, $p_{z,y-1,x-1}^2$ is a third product factor, $0 < x \leq M$, $0 < y \leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1;

the indication information includes indication information of S sets $D_0$ to $D_{S-1}$, $D_0$ to $D_{S-1}$ are respectively in correspondence with $c_0$ to $c_{S-1}$ in a vector set $C = \{c_0, c_1, \ldots c_{S-1}\}$, any vector $c_j$ in C belongs to B, $D_j$ is a proper subset of $A_0$, $S-1 \geq j \geq 0$, and j is an integer; and the second precoding matrix set is a proper subset of the first precoding matrix set, and the second precoding matrix set does not include $W = W_1 \times W_2$ that satisfies the following condition in the first precoding matrix set:

an $x^{th}$ column vector included in X of $W_1$ is the vector $c_j$, and a first product factor $p_{z,y-1,x-1}^0$ of at least one of elements in row x and row x+M of $W_2$ belongs to $D_j$.

According to the method for determining a precoding matrix set in this application, a case in which a relatively large quantity of precoding matrices in a precoding matrix set cannot be used can be avoided by restricting product factors in $W_2$ that correspond to vectors instead of directly prohibiting use of a beam vector, thereby improving system performance.

According to a second aspect, a method for determining a precoding matrix set is provided, including:

generating, by a network device, indication information, where the indication information is used by a terminal device to determine a second precoding matrix set from a first precoding matrix set whose rank is R; and sending, by the network device, the indication information, where each precoding matrix W in the first precoding matrix set satisfies $W = W_1 \times W_2$, W is a matrix of $N_t$ rows and R columns, $N_t$ is greater than or equal to R, $W_t$ satisfies $$W_1 = \begin{bmatrix} X & 0 \\ 0 & X \end{bmatrix},$$

$X = [b_{k_0} \ldots b_{k_{M-1}}]$, $b_{k_i}$ is an $N_t/2 \times 1$ vector, $b_{k_i}$ belongs to a vector set $B = \{b_0, b_1, \ldots, b_{T-1}\}$, T is a quantity of vectors in B, $T \geq M$, T is an integer, $W_2$ is a matrix of 2M rows and R columns, an element $W_2(x,y)$ in row x and column y of $W_2$ satisfies $W_2(x,y) = p_{0,y-1,x-1}^0 \times p_{0,y-1,x-1}^1 \times p_{0,y-1,x-1}^2$, an element $W_2(x+M,y)$ in row x+M and column y of $W_2$ satisfies $W_2(x+M,y) = p_{1,y-1,x-1}^0 \times p_{1,y-1,x-1}^1 \times p_{1,y-1,x-1}^2$, $p_{z,y-1,x-1}^0$ is a first product factor, $p_{z,y-1,x-1}^1$ is a second product factor, $p_{z,y-1,x-1}^2$ is a third product factor, $0 < x \leq M$, $0 < y \leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1;

the indication information includes indication information of S sets $D_0$ to $D_{S-1}$, $D_0$ to $D_{S-1}$ are respectively in correspondence with $c_0$ to $c_{S-1}$ in a vector set $C=\{c_0, c_1, \ldots c_{S-1}\}$, any vector $c_j$ in C belongs to B, $D_j$ is a proper subset of $A_0$, $S-1 \geq j \geq 0$, and j is an integer; and the second precoding matrix set is a proper subset of the first precoding matrix set, and the second precoding matrix set does not include $W=W_1 \times W_2$ that satisfies the following condition in the first precoding matrix set:

an $x^{th}$ column vector included in X of $W_1$ is the vector $c_j$, and a first product factor $p_{z,y-1,x-1}^0$ of at least one of elements in row x and row x+M of $W_2$ belongs to $D_j$.

According to the method for determining a precoding matrix set in this application, a case in which a relatively large quantity of precoding matrices in a precoding matrix set cannot be used can be avoided by restricting product factors in $W_2$ that correspond to vectors instead of directly prohibiting use of the vector, thereby improving system performance.

With reference to the first aspect or the second aspect, in a possible implementation of the first aspect or the second aspect, the indication information of the S sets $D_0$ to $D_{S-1}$ includes S bit fields, the S bit fields are in correspondence with $D_0$ to $D_{S-1}$, each bit field includes at least one bit, a bit field corresponding to $D_j$ indicates an element $g_j$ of $A_0$, and any element of $D_j$ is greater than $g_j$.

With reference to the first aspect or the second aspect, in a possible implementation of the first aspect or the second aspect, any vector $c_j$ of C and any element $D_j(v)$ of $D_j$ satisfy the following condition:

$$|D_j(v) \times (b_{f_h})^H \times c_j| > k_h$$

where b is a vector of B, $K_h \geq 0$, $k_h$ is a real number, $H \geq h \geq 1$, $T-1 \geq f_h \geq 0$, $H \geq 1$, and H is an integer.

With reference to the first aspect or the second aspect, in a possible implementation of the first aspect or the second aspect, C includes at least M mutually orthogonal vectors, and any M mutually orthogonal vectors $c_{j_0}$, $c_{j_1}$, $c_{j_{M-1}}$ and elements $D_{j_0}(v_0)$, $D_{j_1}(v_1)$, ..., $D_{j_{M-1}}(v_{M-1})$ satisfy the following condition:

$$\frac{|D_{j_0}(v_0) \times (b_{f_h})^H \times c_{j_0}|^2 + |D_{j1}(v_1) \times (b_{f_h})^H \times c_{j1}|^2 + \ldots + |D_{j_{M-1}}(v_{M-1}) \times (b_{f_h})^H \times c_{j_{M-1}}|^2}{|D_{j_0}(v_0)|^2 + |D_{j_1}(v_1)|^2 + \ldots + |D_{j_{M-1}}(v_{M-1})|^2} > k_h$$

where $D_{j_0}(v_0), D_{j_1}(v_1), \ldots, D_{j_{M-1}}(v_{M-1})$ are elements of sets $D_{j_0}, D_{j_0}, D_{j_1}, \ldots, D_{j_{M-1}}$ respectively, $b_{f_h}$ is a vector of B, $k_h \geq 0$, $k_h$ is a real number $H \geq h \geq 1$, $T-1 \geq f_h \geq 0$, $H \geq 1$, and H is an integer.

In this manner, at least M orthogonal vectors are simultaneously restricted. Because X in W1 includes M vectors, this manner actually restricts the M vectors included in W1. Because a codebook is formed by a linear combination of the vectors in W1, this manner can achieve more accurate restriction of the codebook.

With reference to the first aspect or the second aspect, in a possible implementation of the first aspect or the second aspect, the indication information of the S sets $D_0$ to $D_{S-1}$ includes H bit fields, and an $h^{th}$ bit field is used to indicate $k_h$.

In this manner, the vector set C and $D_j$ can be determined by using indication information including a relatively small quantity of bits. In an extreme case, at least two vectors and $D_j$ that corresponds to each of the at least two vectors can be determined by using only one bit field (H=1).

With reference to the first aspect or the second aspect, in a possible implementation of the first aspect or the second aspect, the indication information further includes indication information of the vector set C, the indication information of the vector set C is T bits, the T bits are in one-to-one correspondence with T vectors included in B, and a $t^{th}$ bit in the T bits is used to indicate whether a vector $b_{t-1}$ belongs to the vector set C, where $1 \leq t \leq T$.

In this manner, a bitmap of the T bits is used to determine a restricted vector, and the indication information of the S sets $D_0$ to $D_{S-1}$ includes only S or H bit fields. In this way, when S is relatively small, a quantity of bits required for indicating the S sets $D_0$ to $D_{S-1}$ can be reduced.

With reference to the first aspect or the second aspect, in a possible implementation of the first aspect or the second aspect, the indication information of the S sets $D_0$ to $D_{S-1}$ is further used to indicate the vector set C, the indication information of the S sets $D_0$ to $D_{S-1}$ is bit fields, the T bit fields are in one-to-one correspondence with T vectors included in B, each of the T bit fields includes E bits, E is greater than or equal to 1, and a $t^{th}$ bit field in the bit fields is used to indicate whether a vector $b_{t-1}$ belongs to the vector set C, where $1 \leq t \leq T$.

With reference to the first aspect or the second aspect, in a possible implementation of the first aspect or the second aspect, a value range of $p_{z,y-1,x-1}^1$ is a set $A_1$;

the indication information further includes indication information of S sets $E_0$ to $E_{S-1}$. $E_0$ to $E_{S-1}$ are respectively in correspondence with $c_0$ to $c_{S-1}$ in the vector set $C=\{c_0, c_1, \ldots, c_{S-1}\}$, and $E_j$ is a proper subset of $A_1$; and the second precoding matrix set still does not include $W=W_1 \times W$ that satisfies the following condition in the first precoding matrix set:

the $x^{th}$ column vector included in X of $W_1$ is the vector $c_j$, and a second product factor $p_{z,y-1,x-1}^1$ of at least one element of the elements in row x and row x+M of $W_2$ that corresponds to $c_j$ belongs to $E_j$.

According to the method in this embodiment of this application, more refined codebook restriction can be achieved by restricting both a wideband amplitude and a subband amplitude.

According to a third aspect, a communications apparatus is provided, and the communications apparatus has functions of implementing the terminal device in the method designs of the first aspect. These functions may be implemented by hardware, or may be implemented by hardware executing corresponding software. The hardware or software includes one or more units that correspond to the foregoing functions.

According to a fourth aspect, a communications apparatus is provided, and the communications apparatus has functions of implementing the network device in the method designs of the second aspect. These functions may be implemented by hardware, or may be implemented by hardware executing corresponding software. The hardware or software includes one or more units that correspond to the foregoing functions.

According to a fifth aspect, a communications apparatus is provided, including a transceiver, a processor, and a memory. The processor is configured to control the transceiver to send and receive signals; the memory is configured to store a computer program; and the processor is configured to invoke the computer program from the memory and run the computer program, so that a terminal device performs the method according to the first aspect.

According to a sixth aspect, a communications apparatus is provided, including a transceiver, a processor, and a memory. The processor is configured to control the transceiver to send and receive signals; the memory is configured to store a computer program; and the processor is configured to invoke the computer program from the memory and run the computer program, so that a network device performs the method according to the second aspect.

According to a seventh aspect, a computer program product is provided, the computer program product includes computer program code, and when the computer program code runs on a computer, the computer performs the methods according to the foregoing aspects.

According to an eighth aspect, a computer readable medium is provided, the computer readable medium stores program code, and when the computer program code runs on a computer, the computer performs the methods according to the foregoing aspects.

According to a ninth aspect, a chip system is provided, and the chip system includes a processor, and is used by a communications apparatus to implement functions in the foregoing aspects, such as generating, receiving, sending, or processing data and/or information related to the foregoing methods. In a possible design, the chip system further includes a memory, and the memory is configured to store a program instruction and data that are necessary for a terminal device. The chip system may include a chip, or may include a chip and another discrete device.

According to a tenth aspect, a chip system is provided, and the chip system includes a processor, configured to support a communications apparatus in implementing functions in the foregoing aspects, such as generating, receiving, sending, or processing data and/or information related to the foregoing methods. In a possible design, the chip system further includes a memory, and the memory is configured to store a program instruction and data that are necessary for a network device. The chip system may include a chip, or may include a chip and another discrete device.

BRIEF DESCRIPTION OF DRAWINGS

FIG. 1 is a schematic architectural diagram of a mobile communications system applied to an embodiment of this application;

FIG. 2 is a schematic flowchart of a method for determining a precoding matrix set according to an embodiment of this application;

DESCRIPTION OF EMBODIMENTS

Figure 3:
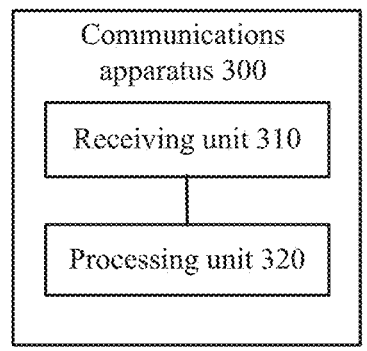
FIG. 3 is a schematic block diagram of a transmission apparatus according to an embodiment of this application.

The following describes the technical solutions of this application with reference to the accompanying drawings.

The technical solutions of the embodiments of this application may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, a future 5th generation (5G) system, or a new radio (NR) system.

FIG. 1 is a schematic architectural diagram of a mobile communications system applied to an embodiment of this application. As shown in FIG. 1, the mobile communications system includes a core network device 110, an access network device 120, and at least one terminal (such as a terminal device 130 and a terminal device 140 in FIG. 1). The terminal is connected to the access network device 120 in a wireless manner, and the access network device 120 is connected to the core network device 110 in a wireless or wired manner. The core network device 110 and the access network device 120 may be different independent physical devices, or functions of the core network device 110 and logical functions of the access network device may be integrated into a same physical device, or one physical device may integrate some functions of the core network device 110 and some functions of the access network device 120. The terminal may be at a fixed location, or may be mobile. FIG. 1 is merely a schematic diagram, and the communications system may further include another network device, for example, may further include a wireless relay device and a wireless backhaul device (which are not drawn in FIG. 1). This embodiment of this application imposes no limitation on quantities of core network devices, access network devices, and terminals included in the mobile communications system.

The terminal in this embodiment of this application, such as the terminal 130 or the terminal 140, may be referred to as user equipment (UE), a terminal device, an access terminal, a subscriber unit, a subscriber station, a mobile station, a remote station, a remote terminal, a mobile device, a user terminal, a wireless communications device, a user agent, a user apparatus, or the like. The terminal may alternatively be a cellular phone, a cordless phone, a Session Initiation Protocol (SIP) phone, a wireless local loop (WLL) station, a personal digital assistant (PDA), a handheld device or a computing device having a wireless communications function, another processing device connected to a wireless modem, an in-vehicle device, or a wearable device, a terminal in a future 5G network, a terminal in a future evolved public land mobile network (PLMN), or the like. This is not limited in this embodiment of this application.

A network device in this embodiment of this application, such as the access network device 120, may be a device configured to communicate with the terminal. The network device may be a base transceiver station (BTS) in a Global System for Mobile Communications (GSM) or in Code Division Multiple Access (CDMA), a NodeB (NB) in a Wideband Code Division Multiple Access (WCDMA) system, an evolved NodeB (eNB or eNodeB) in a Long Term Evolution (LTE) system, or a wireless controller in a cloud radio access network (CRAN) scenario. Alternatively, the network device may be a relay station, an access point, an in-vehicle device, a wearable device, a network device in a future 5G network, a network device in a future evolved PLMN network, or the like. This is not limited in this embodiment of this application.

A manner of restricting a precoding matrix subset in an LTE system is restricting vectors that can be selected for $W_1$. To be specific, a network device notifies a terminal of vectors that can be used by the terminal. If a specific vector is restricted, for example, a first vector is restricted, the first vector cannot appear in $W_1$ when the terminal selects a precoding matrix. However, because vectors close to the first vector have relatively strong energy in a direction of the first vector, the network device usually cannot restrict use of only the first vector but also needs to restrict the vectors close to the first vector. Therefore, vectors close to (or near) the first vector cannot appear in $W_1$, either. In this case, a relatively large quantity of precoding matrices cannot be used, and consequently, system performance deteriorates.

In the New Radio Access Technology (NR), a type II precoding matrix is defined: $W=W_1 \times W_2$. Currently, no technology is related to a solution for restricting a precoding matrix subset of the Type II precoding matrix $W=W_1 \times W_2$.If the manner of restricting a precoding matrix in the LTE system is used, a relatively large quantity of precoding matrices cannot be used, and consequently, system performance deteriorates.

In view of this, this application provides a method for determining a precoding matrix set. A case in which a relatively large quantity of precoding matrices in a precoding matrix set cannot be used can be avoided by restricting product factors in $W_2$ that correspond to vectors instead of directly prohibiting use of the vector, thereby improving system performance.

The method for determining a precoding matrix set in an embodiment of this application may be applied to the Type II precoding matrix W in the NR, or applied to a precoding matrix W that satisfies the following condition:

$W=W_1 \times W_2$, where W is a matrix of $N_t$ rows and R columns, $N_t$ is a quantity of antenna ports, $N_t$ is greater than or equal to R, R is a value of a rank, and $W_1$ satisfies the following:

$$W_1 = \begin{bmatrix} X & 0 \\ 0 & X \end{bmatrix}$$

where $X=[b_{k_0} \ldots b_{k_{M-1}}]$, $b_{k_i}$ is an $N_t 2 \times 1$ vector, $b_{k_i}$ belongs to a vector set $B=\{b_0, b_1, \ldots, b_{T-1}\}$, T is a quantity of vectors in B, T≥M, and T is an integer; and $W_2$ is a matrix of 2M rows and R columns, an element $W_2(x,y)$ in row x and column y of $W_2$ satisfies $W_2(x,y)= p_{0,y-1,x-1}^0 \times p_{0,y-1,x-1}^1 \times p_{0,y-1,x-1}^2$, an element $W_2(x+M,y)$ in row x+M and column y of $W_2$ satisfies $W_2(x+M,y)= p_{1,y-1,x-1}^0 \times p_{1,y-1,x-1}^1 \times p_{1,y-1,x-1}^2$, $p_{z,y-1,x-1}^0$ is a first product factor, $p_{z,y-1,x-1}^1$ is a second product factor, $p_{z,y-1,x-1}^2$ is a third product factor, $0<x\leq M$, $0<y\leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1.

For a precoding matrix set (denoted as a first precoding matrix set) including the precoding matrix W that satisfies the foregoing condition, according to the method for determining a precoding matrix set in this application, a terminal device may determine, from the first precoding matrix set based on indication information sent by a network device, a second precoding matrix set that can be used.

In this application, $p_{z,y-1,x-1}^0$ may represent a wideband amplitude, $p_{z,y-1,x-1}^1$ may represent a subband amplitude, and $p_{z,y-1,x-1}^2$ may represent a phase. The phase is represented by a complex number whose modulus is 1. When the element $W_2(x,y)$ in row x and column y of $W_2$ is represented only by a product of $p_{0,y-1,x-1}^0$ and $p_{0,y-1,x-1}^2$, it may be considered that $p_{0,y-1,x-1}^1=1$. Likewise, for $W_2(x+M,y)$, when $W_2(x+M,y)$ is represented only by a product of $p_{1,y-1,x-1}^0$ and the phase $p_{1,y-1,x-1}^2$, $p_{1,y-1,x-1}^1=1$.

FIG. 2 is a schematic flowchart of a method for determining a precoding matrix set according to an embodiment of this application. The method may be applied to the precoding matrix W described above. The following describes, with reference to FIG. 2, in detail the method for determining a precoding matrix set in this embodiment of this application.

S210. A network device sends indication information to a terminal.

The indication information includes indication information of S sets $D_0$ to $D_{S-1}$. $D_0$ to $D_{S-1}$ are respectively in one-to-one correspondence with $C_0$ to $C_{S-1}$, any vector $c_j$ in C belongs to B, $D_j$ is a proper subset of $A_0$, $S-1 \geq j \geq 0$, and j is an integer.

S220. The terminal device determines, based on the indication information, a second precoding matrix set from a first precoding matrix set whose rank is R.

The second precoding matrix set is a proper subset of the first precoding matrix set, and the second precoding matrix set does not include $W=W_1 \times W_2$ that satisfies the following condition in the first precoding matrix set:

an $x^{th}$ column vector included in X of $W_1$ is the vector $c_j$, and a first product factor $p_{z,y-1,x-1}^0$ of at least one of elements in row x and row x+M of $W_2$ belongs to $D_j$.

Specifically, the terminal device can determine, based on the indication information sent by the network device, $D_0$ to $D_{S-1}$ that are in one-to-one correspondence with $c_0$ to $c_{S-1}$ in the vector set C. The terminal device determines, based on the vector set C and the sets $D_0$ to $D_{S-1}$, that if the $x^{th}$ column vector included in X of $W=W_1 \times W_2$ in the first precoding matrix set is the vector $c_j$ and the first product factor $p_{z,y-1,x-1}^0$ of at least one of elements in row x and row x+M of $W_2$ belongs to $D_j$, then $W=W_1 \times W_2$ is a prohibited precoding matrix. In other words, the precoding matrix cannot be used. After the prohibited precoding vector is removed from the first precoding matrix set, remaining precoding vectors form the second precoding matrix set. Alternatively, the terminal device determines, based on the vector set C and the sets $D_0$ to $D_{S-1}$, that if X in $W=W_1 \times W_2$ does not belong to the vector set C, or the $x^{th}$ column vector included in X of $W=W_1 \times W_2$ is the vector $c_j$ but the first product factor $p_{z,y-1,x-1}^0$ of both the elements in row x and row x+M of $W_2$ do not belong to $D_j$, then $W=W_1 \times W_2$ belongs to the second precoding matrix set.

According to the method for determining a precoding matrix set in this application, a case in which a relatively large quantity of precoding matrices in a precoding matrix set cannot be used can be avoided by restricting product factors in $W_2$ that correspond to vectors instead of directly prohibiting use of the vector, thereby improving system performance.

The following describes this embodiment of this application by using $A_0=\{1, \sqrt{0.5}, \sqrt{0.25}, \sqrt{0.125}, \sqrt{0.0625}, \sqrt{0.0313}, \sqrt{0.0156}, 0\}$ as an example.

For example, R=1 and T=32. Because T=32, B=$\{b_0, b_1, \ldots, b_{31}\}$. The vector set C is C=$\{b_0, b_1\}$, and a set corresponding to $b_0$ is $D_0=\{1, \sqrt{0.5}\}$, a set corresponding to $b_1$ is $D_1=\{1, \sqrt{0.5}, \sqrt{0.25}\}$, and elements of $D_0$ do not include $\sqrt{0.125}$ and $\sqrt{0.25}$. Assuming that, in a first codebook set, a precoding matrix (denoted as $W^1$) satisfies $W^1=W_1^1 \times W_2^1$, another precoding matrix (denoted as $W^2$) satisfies $W^2=W_1^2 \times W_2^2$, and:

$$W_1^2 = \begin{bmatrix} b_0 & b_1 & 0 \\ 0 & b_0 & b_1 \end{bmatrix},$$

-continued $$W_2^1 = \begin{bmatrix} p_{0,0,0}^0 \cdot p_{0,0,0}^1 \cdot p_{0,0,0}^2 \\ p_{0,0,1}^0 \cdot p_{0,0,1}^1 \cdot p_{0,0,1}^2 \\ p_{1,0,0}^0 \cdot p_{1,0,0}^1 \cdot p_{1,0,0}^2 \\ p_{1,0,1}^0 \cdot p_{1,0,1}^1 \cdot p_{1,0,1}^2 \end{bmatrix} = \begin{bmatrix} \sqrt{0.5} \cdot p_{0,0,0}^1 \cdot p_{0,0,0}^2 \\ \sqrt{0.25} \cdot p_{0,0,1}^1 \cdot p_{0,0,1}^2 \\ \sqrt{0.5} \cdot p_{1,0,0}^1 \cdot p_{1,0,0}^2 \\ \sqrt{0.125} \cdot p_{1,0,1}^1 \cdot p_{1,0,1}^2 \end{bmatrix}$$

$$W_1^2 = \begin{bmatrix} b_0 & b_1 & 0 \\ 0 & b_0 & b_1 \end{bmatrix},$$

$$W_2^2 = \begin{bmatrix} p_{0,0,0}^0 \cdot p_{0,0,0}^1 \cdot p_{0,0,0}^2 \\ p_{0,0,1}^0 \cdot p_{0,0,1}^1 \cdot p_{0,0,1}^2 \\ p_{1,0,0}^0 \cdot p_{1,0,0}^1 \cdot p_{1,0,0}^2 \\ p_{1,0,1}^0 \cdot p_{1,0,1}^1 \cdot p_{1,0,1}^2 \end{bmatrix} = \begin{bmatrix} \sqrt{0.125} \cdot p_{0,0,0}^1 \cdot p_{0,0,0}^2 \\ \sqrt{0.0625} \cdot p_{0,0,1}^1 \cdot p_{0,0,1}^2 \\ \sqrt{0.125} \cdot p_{1,0,0}^1 \cdot p_{1,0,0}^2 \\ \sqrt{0.125} \cdot p_{1,0,1}^1 \cdot p_{1,0,1}^2 \end{bmatrix}$$

Therefore, $W^1$ may be expressed as follows:

$$W^1 = W_1^1 \times W_2^1 = \begin{bmatrix} b_0 \times (p_{0,0,0}^0 \cdot p_{0,0,0}^1 \cdot p_{0,0,0}^2) \\ b_0 \times (p_{1,0,0}^0 \times p_{1,0,0}^1 \cdot p_{1,0,0}^2) \end{bmatrix} + \begin{bmatrix} b_1 \times (p_{0,0,1}^0 \cdot p_{0,0,1}^1 \cdot p_{0,0,1}^2) \\ b_1 \times (p_{1,0,1}^0 \cdot p_{1,0,1}^1 \cdot p_{1,0,1}^2) \end{bmatrix}$$

$W^2$ has a same expression form. Correspondences exist between a vector $b_0$ and first product factors $p_{0,0,0}^0$ and $p_{1,0,0}^0$, between $b_0$ and second product factors $p_{0,0,0}^1$ and $p_{1,0,0}^1$, and between $b_0$ and third product factors $p_{0,0,0}^2$ and $p_{1,0,0}^2$. Correspondences exist between a vector $b_1$ and the first product factors $p_{0,0,1}^0$ and $p_{1,0,1}^0$, between $b_1$ and the second product factors $p_{0,0,1}^1$ and $p_{1,0,1}^1$, and between $b_1$ and the third product factors $p_{0,0,1}^2$ and $p_{1,0,1}^2$.

For $W^1$, a vector $b_0$ in column 1 of $W_1^1$ belongs to the vector set C, and a product factor $\sqrt{0.5}$ of elements in row 1 of $W_2^1$ belongs to $D_0$. Therefore, it may be determined that the second precoding matrix set does not include $W^1$. In other words, $W^1$ does not belong to the second precoding matrix set.

For $W^2$, although a vector $b_0$ in column 1 and column 3 of $W_1^2$ belongs to the vector set C, a product factor $\sqrt{0.125}$ of elements in row 1 and row 3 of $W_2^2$ does not belong to $D_0$. A vector $b_1$ in column 2 and column 4 of $W_1^2$ belongs to the vector set C, but neither a product factor $\sqrt{0.0625}$ nor a product factor $\sqrt{0.125}$ of elements in row 2 and row 4 of $W_2^2$ belongs to $D_1$. Therefore, it may be determined that $W^2$ belongs to the second precoding matrix set.

It should be understood that the foregoing $W^1$ and $W^2$ are a specific example of a matrix that satisfies $W=W_1 \times W_2$ in the first precoding matrix set, $W_1^1$ and $W_1^2$ are two specific examples of $W_1$ and $W_2^1$ and $W_2^2$ are two specific examples of $W_2$.

The following describes in detail the indication information sent by the network device.

The following describes in detail several possible formats of the indication information (denoted as indication information of the S sets $D_0$ to $D_{S-1}$. It should be understood that a manner of determining the vector set C by the terminal device is not limited in this embodiment of this application.

Format 1

Indication information #1 includes S bit fields, the S bit fields are in one-to-one correspondence with $D_0$ to $D_{S-1}$, each bit field includes at least one bit, and a bit field corresponding to $D_j$ indicates an element (denoted as $g_j$) of $A_0$. Any element of $D_j$ is greater than $g_j$.

For example, the terminal device may determine, based on the indication information, that the vector set C satisfies: $C=\{c_0, c_1, \ldots, c_{S-1}\}=\{b_0, b_1, \ldots, b_6\}$ and S=7. The indication information sent by the network device includes seven bit fields (denoted as a bit field #1 to a bit field #7). The bit field #1 to the bit field #7 are in one-to-one correspondence with seven vectors in the vector set C. To be specific, the bit field #1 corresponds to $b_0$, the bit field #2 corresponds to $b_1$, . . . , and the bit field #7 corresponds to $b_6$. Each bit field includes three bits, and each bit field indicates an element of $A_0$. The terminal device can determine $D_0$ to $D_6$ based on the bit field #1 to the bit field #7. Description is given with reference to Table 1.

TABLE 1

| $b_0$ | $b_1$ | $b_2$ | $b_3$ | $b_4$ | $b_5$ | $b_6$ |
|---|---|---|---|---|---|---|
| Bit field #1 | Bit field #2 | Bit field #3 | Bit field #4 | Bit field #5 | Bit field #6 | bit field #7 |
| [0 0 1] | [0 1 0] | [0 1 1] | [1 0 0] | [1 0 1] | [1 1 0] | [1 1 1] |
| $\sqrt{0.0156}$ | $\sqrt{0.0313}$ | $\sqrt{0.0625}$ | $\sqrt{0.125}$ | $\sqrt{0.25}$ | $\sqrt{0.5}$ | 1 |

Referring to Table 1, the bit field #1 is 001, indicating an element $\sqrt{0.0156}$ of $A_0$. All elements greater than $\sqrt{0.0156}$ in $A_0$ form $D_0$, that is:

$$D_0 = \{1, \sqrt{0.5}, \sqrt{0.25}, \sqrt{0.125}, \sqrt{0.0625}, \sqrt{0.0313}\}$$

Likewise, $D_0$ to $D_6$ may be determined respectively based on the bit field #2 to the bit field #5.

In the prior art, usually a bitmap manner is used for indication. In the present invention, the bitmap manner may be used to indicate each available amplitude of each restricted vector. For example, if A0 has eight amplitudes to be selected, each vector needs eight bits to indicate a restricted amplitude of the vector. However, in the present invention, once an amplitude is restricted for use, usually all amplitudes greater than or equal to the amplitude are restricted for use. Therefore, a manner of indicating one of amplitudes of A0 may be used for restriction. In this way, each vector needs only three bits to determine a restricted amplitude value of the vector.

Format 2

$A_0$ includes F elements. Indication information #1 includes S bit fields, the S bit fields are in one-to-one correspondence with $D_0$ to $D_{S-1}$, each bit field includes F bits, and the F bits are used respectively to indicate the F elements of $A_0$. In the F bits of a bit field corresponding to $D_j$, an element of $A_0$ indicated by a bit that is 0 or 1 belongs to $D_j$.

For example, the terminal device may determine, based on the indication information, that the vector set C satisfies: $C=\{c_0, c_1, \ldots, c_{S-1}\}=\{b_0, b_1, \ldots, b_6\}$, S=7, and F=8. The indication information #1 includes seven bit fields (denoted as a bit field #1 to a bit field #7). The bit field #1 to the bit field #7 are in one-to-one correspondence with seven vectors in the vector set C. To be specific, the bit field #1 corresponds to $b_0$, the bit field #2 corresponds to $b_1$, . . . , and the bit field #7 corresponds to $b_6$. Each bit field includes eight bits. In an order from a most significant bit to a least significant bit, bits of a bit field respectively indicate a first element to an eighth element of $A_0$. A value indicated by a bit that is 0 or 1 belongs to $D_j$. For example, if a bit that is 0 indicates that a value indicated by the bit belongs to $D_j$ $D_0$ to $D_6$ may be determined based on the bit field #1 to the bit field #7. Description is given with reference to Table 2.

TABLE 2

| $b_0$ | $b_1$ | $b_2$ | $b_3$ | $b_4$ | $b_5$ | $b_6$ |
|---|---|---|---|---|---|---|
| Bit field #1 | Bit field #2 | Bit field #3 | Bit field #4 | Bit field #5 | Bit field #6 | Bit field #7 |
| 11000000 | 11100000 | 11100000 | 11010000 | 00001100 | 00000110 | 11011000 |

Referring to Table 2, the bit field #1 is 11000000. It may be determined that a set $D_0$ corresponding to the bit field #1 is $D_0=\{1, \sqrt{0.5}, \sqrt{0.25}, \sqrt{0.125}, \sqrt{0.0625}, \sqrt{0.0313}\}$. If the bit field #2 is 11100000, it may be determined that a set $D_j$ corresponding to the bit field #2 is $D_1=\{1, \sqrt{0.5}, \sqrt{0.25}, \sqrt{0.125}, \sqrt{0.0625}\}$. Likewise, $D_2$ to $D_6$ may be determined respectively based on the bit field #3 to the bit field #7.

For the foregoing Format 1 and Format 2, further, the indication information of the S sets $D_0$ to $D_{S-1}$ is T bit fields, the T bit fields correspond to T vectors in a vector set B, and S≤T. A $t^{th}$ bit field in the T bit fields is used to indicate whether a vector $b_t$ belongs to the vector set C, where 0≤t≤T-1. S bit fields in the T bit fields determine both S vectors in the vector set C and $D_0$ to $D_{S-1}$.

For example, in the foregoing Format 1, a $t^{th}$ bit field in the S bit fields is 111. A value determined by the bit field is 1, indicating that all elements of $A_0$ can be used. Therefore, it may be determined that a vector $b_{t-1}$ does not belong to C.

Optionally, the indication information may further include indication information (denoted as indication information #2) of the vector set C. The indication information #2 includes T bits, the T bits are in one-to-one correspondence with T vectors included in B, and a $t^{th}$ bit in the T bits is used to indicate whether a vector $b_{t-1}$ belongs to the vector set C where 1≤t≤T.

For example, T=8, the indication information #2 includes eight bits, the eight bits, in an order a most significant bit to a least significant bit, respectively correspond to $b_0$, $b_1$, ..., $b_7$, and a bit that is 0 indicates that the vector $b_t$ belongs to the vector set C. If the indication information #2 is 00111111, it may be determined that $b_0$ and $b_1$ belong to the vector set C.

It should be understood that the indication information #2 herein is different from the indication information #1.

Optionally, the indication information may be used to indicate $b_{f_h}$ and $k_h$, the terminal may determine the vector set C and the sets $D_0$ to $D_{S-1}$ based on $b_{f_h}$ and $k_h$, and further the terminal may determine the second precoding matrix set. For example, the terminal may determine C and the sets $D_0$ to $D_{S-1}$ based on $b_{f_h}$ and $k_h$ in the following two manners.

Manner 1

Any vector of $c_j$ of C and any element $D_j(v)$ of $D_j$ satisfy the following condition:

$$|D_j(v) \times (b_{f_h})^H \times c_j| > k_h$$

where $D_{f_h}$ is a vector of B, $k_h \geq 0$, $k_h$ is a real number, H≥h≥1, T-1≥$f_h$≥0, H≥1, and H is an integer.

Specifically, the terminal device can obtain $b_{f_h}$ and $k_h$ based on the indication information sent by the network device; determine, based on $b_{f_h}$ and $k_h$, the vector set C and the sets $D_0$ to $D_{S-1}$ that satisfy the foregoing relational expression; and then determine the second precoding matrix set.

Manner 2

C includes at least M mutually orthogonal vectors, and any mutually M orthogonal vectors $c_{j_0}$, $c_{j_1}$, ..., $c_{j_{M-1}}$ and elements $D_{j_0}(v_0), D_{j_1}(v_1), \ldots, D_{j_{M-1}}(v_{M-1})$ satisfy the following condition:

$$\frac{|D_{j_0}(v_0) \times (b_{f_h})^H \times c_{j_0}|^2 + |D_{j_1}(v_1) \times (b_{f_h})^H \times c_{j_1}|^2 + \ldots + |D_{j_{M-1}}(v_{M-1}) \times (b_{f_h})^H \times c_{j_{M-1}}|^2}{|D_{j_0}(v_0)|^2 + |D_{j_1}(v_1)|^2 + \ldots + |D_{j_{M-1}}(v_{M-1})|^2} > k_h$$

where $D_{j_0}(v_0), D_{j_1}(v_1), \ldots, D_{j_{M-1}}(v_{M-1})$ are elements of sets $D_{j_0}, D_{j_1}, \ldots, D_{j_{M-1}}$ respectively, $b_{f_h}$ is a vector of B, $k_h \geq 0$, $k_h$ is a real number, H≥h≥1, T-1≥$f_h$≥0, H≥1, and H is an integer.

Specifically, the terminal device can obtain $b_{f_h}$ and $k_h$ based on the indication information sent by the network device; determine, based on $b_{f_h}$ and $k_h$, the vector set C and the sets $D_0$ to $D_{S-1}$ that satisfy the foregoing relational expression; and then determine the second precoding matrix set.

In this manner, at least M orthogonal vectors are simultaneously restricted. Because X in W1 includes M vectors, this manner actually restricts the M vectors included in W1. Because a codebook is formed by a linear combination of the vectors in W1, this manner can achieve more accurate restriction of the codebook.

For example, T=8, the vector set B includes eight vectors $b_0, b_1, \ldots, b_7$, and M=2, where the vector $b_0$ is orthogonal to the vector $b_4$, the vector $b_1$ is orthogonal to $b_5$, the vector $b_2$ is orthogonal to $b_6$, and the vector $b_3$ is orthogonal to the vector $b_7$. The network device notifies the terminal device of $b_{f_1}=b_0$, $k_1=0.5$, and H=1 by using the indication information; and the terminal device sequentially substitutes ($b_0$, $b_4$), ($b_1$, $b_5$), ($b_2$, $b_6$), and ($b_3$, $b_7$) into the formula in Manner 2. The following uses ($b_0$, $b_4$) as an example:

A first product factor corresponding to $b_0$ is $a_0$, a first product factor corresponding to $b_1$ is $a_1$, $a_0$ belongs to $A_0$, and $a_1$ belongs to $A_0$. If $$\frac{|a_0 \times (b_0)^H \times b_0|^2 + |a_1 \times (b_0)^H \times b_1|^2}{|a_0|^2 + |a_1|^2} > 0.5,$$

the vectors $b_0$ and $b_1$ belong to C, $a_0$ belongs to $D_0$, and $a_1$ belongs to $D_1$. All first product factors in $A_0$ are traversed. All $a_0$ satisfying the foregoing formula belong to the set $D_0$, and all $a_1$ satisfying the foregoing formula belong to the set $D_1$.

($b_1$, $b_5$), ($b_2$, $b_6$), and ($b_3$, b7) are traversed, and all first factors in $A_0$ that correspond to each pair of orthogonal vectors are traversed. Vectors satisfying the foregoing formula belong to the set C, and a first product factor corresponding to each vector and satisfying the condition belongs to a set $D_j$ corresponding to the vector.

The following specifically describes how the terminal device determines $b_{f_h}$ and $k_h$.

Optionally, the indication information sent by the network device may include indication information (denoted as indication information #3) of $k_h$.

In a possible implementation, the indication information #3 may include H bit fields, and an $h^{th}$ bit field in the H bit fields is used to indicate $k_h$.

For example, $k_h \in \{1, 0.5, 0.25, 0\}$. Each bit field includes two bits used to indicate a value of $\{1, 0.5, 0.25, 0\}$. Assuming that H=6, six bit fields included in the indication information are denoted as a bit field #1 to a bit field #6. Description is given with reference to Table 3

TABLE 3

| Bit field #1 | Bit field #2 | Bit field #3 | Bit field #4 | Bit field #5 | Bit field #6 |
|---|---|---|---|---|---|
| 00 | 01 | 10 | 11 | 10 | 11 |
| 0 | 0.25 | 0.5 | 1 | 0.5 | 1 |

The bit field #1 to the bit field #6 respectively indicate $k_1=0$, $k_2=0.25$, $k_3=0.5$, $k_4=1$, $k_5=0.5$, and $k_6=1$. In the vector set B, an $f_1-1^{th}$ vector, an $f_2-1^{th}$ vector, an $f_3-1^{th}$ vector, an $f_4-1^{th}$ vector, an $f_5-1^{th}$ vector, and an $f_6-1^{th}$ vector are $b_{f_1}$, $b_{f_2}$, $b_{f_3}$, $b_{f_4}$, $b_{f_5}$, $b_{f_6}$ respectively, which correspond to the bit field #1, the bit field #2, the bit field #3, the bit field #4, the bit field $5, and the bit field #6. For example, for the bit field #2 corresponding to $b_{f_2}$, a threshold of the bit field #2 is $k_2=0.25$.

In this manner, the vector set C and $D_j$ can be determined by using indication information including a relatively small quantity of bits. In an extreme case, at least two vectors and $D_j$ that corresponds to each of the at least two vectors can be determined by using only one bit field (H=1).

Optionally, the indication information sent by the network device may include indication information (denoted as indication information #4) of $b_{f_h}$, and the terminal device may determine $b_{f_h}$ based on the indication information #4.

In a possible implementation, the indication information #4 includes H bits, and an $h^{th}$ bit is used to indicate $b_{f_h}$.

For example, H=4, the indication information sent by the network device includes T bits, and the T bits are in one-to-one correspondence with T vectors in T vector sets B. For example, T=8, a bitmap is 00001111, the indication information #4 includes four least significant bits of the bitmap, and an $h^{th}$ bit in the four least significant bits indicates $b_{f_h}$.

Optionally, in this embodiment of this application, the indication information may alternatively be indication information #5. The indication information #5 may indicate both the vector set C and $D_0$ to $D_{S-1}$.

Specifically, the indication information #5 is T bit fields. The T bit fields are in one-to-one correspondence with T vectors included in B, each of the T bit fields includes E bits, E is greater than or equal to 1, and a $t^{th}$ bit field in the T bit fields is used to indicate whether a vector $b_{t-1}$ belongs to the vector set C, where $1 \leq t \leq T$.

In this manner, a bitmap of the T bits is used to determine a restricted vector, and the indication information of the S sets $D_0$ to $D_{S-1}$ includes only S or H bit fields. In this way, when S is relatively small, a quantity of bits required for indicating the S sets $D_0$ to $D_{S-1}$ can be reduced.

In a possible implementation, each bit field indicates an element of $A_0$, and if a set including elements greater than or equal to an element indicated by a specific bit group is a proper subset of $A_0$, a vector indicated by the bit group belongs to the vector set C.

For example, E=3, T=8, and S=7. The indication information sent by the network device includes eight bit fields (denoted as a bit field #1 to a bit field #8). The bit field #1 to the bit field #8 are in one-to-one correspondence with T vectors in the vector set B. To be specific, the bit field #1 corresponds to $b_0$, the bit field #2 corresponds to $b_1, \ldots,$ and the bit field #8 corresponds to $b_7$. Each bit field includes three bits, and each bit field indicates an element of $A_0$. Description is given with reference to Table 4.

TABLE 4

| | $b_0$ | $b_1$ | $b_2$ | $b_3$ | $b_4$ | $b_5$ | $b_6$ | $b_7$ |
|---|---|---|---|---|---|---|---|---|
| | Bit field #1 | Bit field #2 | Bit field #3 | Bit field #4 | Bit field #5 | Bit field #6 | Bit field #7 | Bit field #8 |
| | [0 0 0] | [0 0 1] | [0 1 0] | [0 1 1] | [1 0 0] | [1 0 1] | [1 1 0] | [1 1 1] |
| | 0 | $\sqrt{0.0156}$ | $\sqrt{0.0313}$ | $\sqrt{0.0625}$ | $\sqrt{0.125}$ | $\sqrt{0.25}$ | $\sqrt{0.5}$ | 1 |

Referring to Table 4, each of the bit field #2 to the bit field #8 is used to indicate a non-zero element of $A_0$. The bit field #2 to the bit field #8 are in one-to-one correspondence with vectors in the set C, and the bit field #2 to the bit field #8 may be used to indicate $D_0$ to $D_6$.

For example, the bit field #2 is 001, indicating an element $\sqrt{0.0156}$ of $A_0$. All elements greater than $\sqrt{0.0156}$ in $A_0$ form $D_0$, that is:

$$D_0 = \{1, \sqrt{0.5}, \sqrt{0.25}, \sqrt{0.125}, \sqrt{0.0625}, \sqrt{0.0313}\}$$

Likewise, $D_1$ to $D_6$ may be determined respectively based on the bit field #3 to the bit field #8.

The bit field #1 is 000, indicating an element 0 of $A_0$. All elements greater than 0 in $A_0$ form $b_0$, which corresponds to a set $\{1, \sqrt{0.5}, \sqrt{0.25}, \sqrt{0.125}, \sqrt{0.0625}, \sqrt{0.0313}, \sqrt{0.0156}\}$. The set is $A_0$; therefore, $b_0$ does not belong to the vector set C.

In another possible implementation, the E bits are respectively used to indicate E elements of $A_0$. If bits of a specific bit field are all zeros or all ones, it indicates that a vector corresponding to the bit field does not belong to the vector set C, and a vector corresponding to a bit field whose bits are not all zeros or ones belongs to the vector set C.

For example, E=8, T=8, and S=7. The indication information sent by the network device includes eight bit fields (denoted as a bit field #1 to a bit field #8). The bit field #1 to the bit field #8 are in one-to-one correspondence with T vectors in the vector set B. To be specific, the bit field #1 corresponds to $b_0$, the bit field #2 corresponds to $b_1 \ldots$ and the bit field #8 corresponds to $b_7$.

Each bit field includes eight bits. In an order from a most significant bit to a least significant bit, bits of a bit field respectively indicate a first element to an eighth element of A0. A bit that is 0 or 1 indicates that a corresponding element belongs to $D_j$. For example, a bit that is 0 indicates that a corresponding element belongs to $D_j$. If the bit field #1 is 11000000, it may be determined that a set $D_0$ corresponding to the bit field #1 is $D_0 = \{1, \sqrt{0.5}, \sqrt{0.25}, \sqrt{0.125}, \sqrt{0.0625}, \sqrt{0.0313}\}$. If the bit field #2 is 11100000, it may be determined that a set $D_1$ corresponding to the bit field #2 is $D_1 = \{1, \sqrt{0.5}, \sqrt{0.25}, \sqrt{0.125}, \sqrt{0.0625}\}$. If the bit field #8 is 11111111, it indicates that all elements in $A_0$ can be used and then $b_7$ corresponding to the bit field #8 does not belong to the vector set C. Bit fields separately corresponding to the bit field #3 to the bit field #7 are not all ones, and $D_1$ to $D_6$ may be determined respectively based on the bit field #3 to the bit field #7.

Optionally, a value range of $p_{z,y-1,x-1}^1$ is a set $A_1$, the indication information is further used to indicate S sets $E_0$ to $E_{S-1}$ are respectively in one-to-one correspondence with $c_0$, to $c_{S-1}$, and $E_j$ is a proper subset of $A_1$.

The second precoding matrix set still does not include $W=W_1 \times W_2$ that satisfies the following condition in the first precoding matrix set:

the $x^{th}$ column vector included in X of $W_1$ is the vector $c_j$, and a second product factor $p_{z,y-1,x-1}^1$ of at least one of elements in row x and row x+M of $W_2$ that corresponds to $c_j$ belongs to $E_j$.

Specifically, the S sets $E_0$ to $E_{S-1}$ may be indicated with reference to the foregoing described method. The terminal device may determine the second precoding matrix set based on the set C, the sets $D_0$ to $D_{S-1}$, and the sets $E_0$ to $E_{S-1}$. For brevity, details about how the indication information indicates the sets $E_0$ to $E_{S-1}$ are not described herein again.

According to the method in this embodiment of this application, more refined codebook restriction can be achieved by restricting both a wideband amplitude and a subband amplitude.

It should be understood that, in this embodiment of this application, $p_{z,y-1,x-1}^1$ may be 1, and the element $W_2(x,y)$ in row x and column y of $W_2$ satisfies $W_2(x,y)=p_{0,y-1,x-1}^0 \times p_{0,y-1,x-1}^2$, and the element $W_2(x+M,y)$ in row x+M and column y of $W_2$ satisfies $W_2(x+M,y)=p_{1,y-1,x-1}^0 \times p_{1,y-1,x-1}^2$.

Optionally, in this embodiment of this application, the network device may send the plurality of pieces of indication information by using higher layer signaling. In other words, the higher layer signaling may carry the plurality of pieces of indication information.

For example, the higher layer signaling may be radio resource control (RRC) signaling or a Media Access Control-control element (MAC CE).

Optionally, the method may further include:

S230. The network device sends a CSI-RS to the terminal device.

S240. The terminal device determines a channel matrix based on the CSI-RS, and determines, based on the channel matrix, a first PMI used to indicate $W_1$ and a second PMI used to indicate $W_2$.

The network device may determine, based on the first PMI and the second PMI, a precoding matrix to be used when the network device sends data to the terminal device.

FIG. 3 is a schematic block diagram of a communications apparatus according to an embodiment of this application. The communications apparatus 300 shown in FIG. 3 includes a receiving unit 310 and a processing unit 320.

The receiving unit 310 is configured to receive indication information.

The processing unit 320 is configured to determine, based on the indication information received by the receiving unit, a second precoding matrix set from a first precoding matrix set whose rank is R.

Each precoding matrix W in the first precoding matrix set satisfies $W=W_1 \times W_2$, W is a matrix of $N_t$ rows and R columns, $N_t$ is greater than or equal to R, $W_1$ satisfies $$W_1 = \begin{bmatrix} X & 0 \\ 0 & X \end{bmatrix},$$

$X=[b_{k_0} \ldots b_{k_{M-1}}]$, $b_{k_i}$ is an $N_t/2 \times 1$ vector, $b_{k_i}$ belongs to a vector set $B=\{b_0, b_1, \ldots, b_{T-1}\}$, T is a quantity of vectors in B, $T \geq M$, T is an integer, $W_2$ is a matrix of 2M rows and R columns, an element $W_2(x,y)$ in row x and column y of $W_2$ satisfies $W_2(x,y)=p_{0,y-1,x-1}^0 \times p_{0,y-1,x-1}^1 \times p_{0,y-1,x-1}^2$, an element $W_2(x+M,y)$ in row x+M and column y of $W_2$ satisfies $W_2(x+M,y)=p_{1,y-1,x-1}^0 \times p_{1,y-1,x-1}^1 \times p_{1,y-1,x-1}^2$, $p_{z,y-1,x-1}^0$ is a first product factor, $p_{z,y-1,x-1}^1$ is a second product factor, $p_{z,y-1,x-1}^2$ is a third product factor, $0<x\leq M$, $0<y\leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1.

The indication information includes indication information of S sets $D_0$ to $D_{S-1}$, $D_0$ to $D_{S-1}$ are respectively in one-to-one correspondence with $c_0$ to $c_{S-1}$ in a vector set $C=\{c_0, c_1, \ldots, c_{S-1}\}$, any vector $c_j$ in C belongs to B, $D_j$ is a proper subset of $A_0$, $S-1 \geq j \geq 0$, and j is an integer.

The second precoding matrix set is a proper subset of the first precoding matrix set, and the second precoding matrix set does not include $W=W_1 \times W_2$ that satisfies the following condition in the first precoding matrix set:

an $x^{th}$ column vector included in X of $W_1$ is the vector $c_j$, and a first product factor $p_{z,y-1,x-1}^0$ of at least one of elements in row x and row x+M of $W_2$ belongs to $D_j$.

Figure 4:
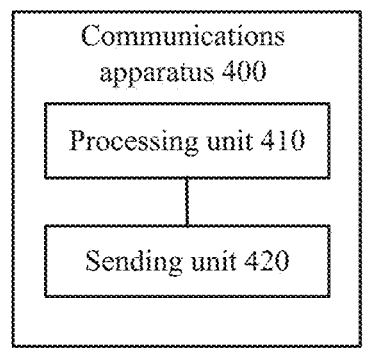
FIG. 4 is a schematic block diagram of a transmission apparatus according to an embodiment of this application.

FIG. 4 is a schematic block diagram of a communications apparatus according to an embodiment of this application. The communications apparatus 400 shown in FIG. 4 includes a processing unit 410 and a sending unit 420.

The processing unit 410 is configured to generate indication information, where the indication information is used by a terminal device to determine a second precoding matrix set from a first precoding matrix set whose rank is R.

The sending unit 420 is configured to send the indication information generated by the processing unit 410.

Each precoding matrix W in the first precoding matrix set satisfies $W=W_1 \times W_2$. W is a matrix of $N_t$ rows and R columns, $N_t$ is greater than or equal to R, $W_1$ satisfies $$W_1 = \begin{bmatrix} X & 0 \\ 0 & X \end{bmatrix},$$

$X=[b_{k_0} \ldots b_{k_{M-1}}]$, $b_{k_i}$ is an $N_t/2 \times 1$ vector, $b_{k_i}$ belongs to a vector set $B=\{b_0, b_1, \ldots, b_{T-1}\}$, T is a quantity of vectors in B, $T \geq M$, T is an integer, $W_2$ is a matrix of 2M rows and R columns, an element $W_2(x,y)$ in row x and column y of $W_2$ satisfies $W_2(x,y)=p_{0,y-1,x-1}^0 \times p_{0,y-1,x-1}^1 \times p_{0,y-1,x-1}^2$, an element $W_2(x+M,y)$ in row x+M and column y of $W_2$ satisfies $W_2(x+M,y)=p_{1,y-1,x-1}^0 \times p_{1,y-1,x-1}^1 \times p_{1,y-1,x-1}^2$, $p_{z,y-1,x-1}^0$ is a first product factor, $p_{z,y-1,x-1}^1$ is a second product factor, $p_{z,y-1,x-1}^2$ is a third product factor, $0<x\leq M$, $0<y\leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1.

The indication information includes indication information of S sets $D_0$ to $D_{S-1}$, $D_0$ to $D_{S-1}$ are respectively in one-to-one correspondence with $c_0$ to $c_{S-1}$ in a vector set $C=\{c_0, c_1, \ldots, c_{S-1}\}$, any vector $c_j$ in C belongs to B, $D_j$ is a proper subset of $A_0$, $S-1 \geq j \geq 0$, and j is an integer.

The second precoding matrix set is a proper subset of the first precoding matrix set, and the second precoding matrix set does not include $W=W_1 \times W_2$ that satisfies the following condition in the first precoding matrix set:

an $x^{th}$ column vector included in X of $W_1$ is the vector $c_j$, and a first product factor $p_{z,y-1,x-1}^0$ of at least one of elements in row x and row x+M of $W_2$ belongs to $D_j$.

Optionally, in an embodiment, the indication information of the S sets $D_0$ to $D_{S-1}$ includes S bit fields, the S bit fields are in one-to-one correspondence with $D_0$ to $D_{S-1}$, each bit field includes at least one bit, a bit field corresponding to $D_j$ indicates an element $g_j$ of $A_0$, and any element of $D_j$ is greater than $g_j$.

Optionally, in an embodiment, any vector $c_j$ of C and any element $D_j(v)$ of $D_j$ satisfy the following condition:

$$|D_j(v) \times (b_{f_h})^H \times c_j| k_h$$

where $b_{f_h}$ is a vector of B, $k_h \geq 0$, $k_h$ is a real number, $H \geq h \geq 1$, $T-1 \geq f_h \geq 0$, $H \geq 1$, and H is an integer.

Optionally, in an embodiment, C includes at least M mutually orthogonal vectors, and any M mutually orthogonal vectors $c_{j_0}, c_{j_1}, \ldots, c_{j_{M-1}}$ and elements $D_{j_0}(v_0), D_{j_1}(v_1), \ldots, D_{j_{M-1}}(v_{M-1})$ satisfy the following condition:

$$\frac{|D_{j_0}(v_0) \times (b_{f_h})^H \times c_{j_0}|^2 + |D_{j_1}(v_1) \times (b_{f_h})^H \times c_{j_1}|^2 + \ldots + |D_{j_{M-1}}(v_{M-1}) \times (b_{f_h})^H \times c_{j_{M-1}}|^2}{|D_{j_0}(v_0)|^2 + |D_{j_1}(v_1)|^2 + \ldots + |D_{j_{M-1}}(v_{M-1})|^2} > k_h$$

where $D_{j_0}(v_0), D_{j_1}(v_1), \ldots, D_{j_{M-1}}(v_{M-1})$ are elements of sets $D_{j_0}, D_{j_1}, \ldots, D_{j_{M-1}}$ respectively, $b_{f_h}$ is a vector of B, $k_h \geq 0$, $k_h$ is a real number, $H \geq h \geq 1$, $T-1 \geq f_h \geq 0$, $H \geq 1$, and H is an integer.

Optionally, in an embodiment, the indication information of the S sets $D_0$ to $D_{S-1}$ includes H bit fields, and an $h^{th}$ bit field is used to indicate $k_h$.

Optionally, in an embodiment, the indication information further includes indication information of the vector set C, the indication information of the vector set C is T bits, the T bits are in one-to-one correspondence with T vectors included in B, and a $t^{th}$ bit in the T bits is used to indicate whether a vector $b_{t-1}$ belongs to the vector set C, where $1 \leq t \leq T$.

Optionally, in an embodiment, the indication information of the S sets $D_0$ to $D_{S-1}$ is further used to indicate the vector set C, the indication information of the S sets $D_0$ to $D_{S-1}$ is T bit fields, the T bit fields are in one-to-one correspondence with T vectors included in B, each of the T bit fields includes E bits, E is greater than or equal to 1, and a $t^{th}$ bit field in the T bit fields is used to indicate whether a vector $b_{t-1}$ belongs to the vector set C, where $1 \leq t \leq T$.

Optionally, in an embodiment, a value range of $p_{z,y-1,x-1}^1$ is a set $A_1$;

the indication information further includes indication information of S sets $E_0$ to $E_{S-1}$, $E_0$ to $E_{S-1}$ are respectively in one-to-one correspondence with $c_0$ to $c_{S-1}$ in the vector set $C = \{c_0, c_1, \ldots, c_{S-1}\}$, and $E_j$ is a proper subset of $A_1$; and the second precoding matrix set still does not include $W = W_1 \times W_2$ that satisfies the following condition in the first precoding matrix set:

the $x^{th}$ column vector included in X of $W_1$ is the vector $c_j$, and a second product factor $p_{z,y-1,x-1}^1$ of at least one of elements in row x and row x+M of $W_2$ that corresponds to $c_j$ belongs to $E_j$.

Figure 5:
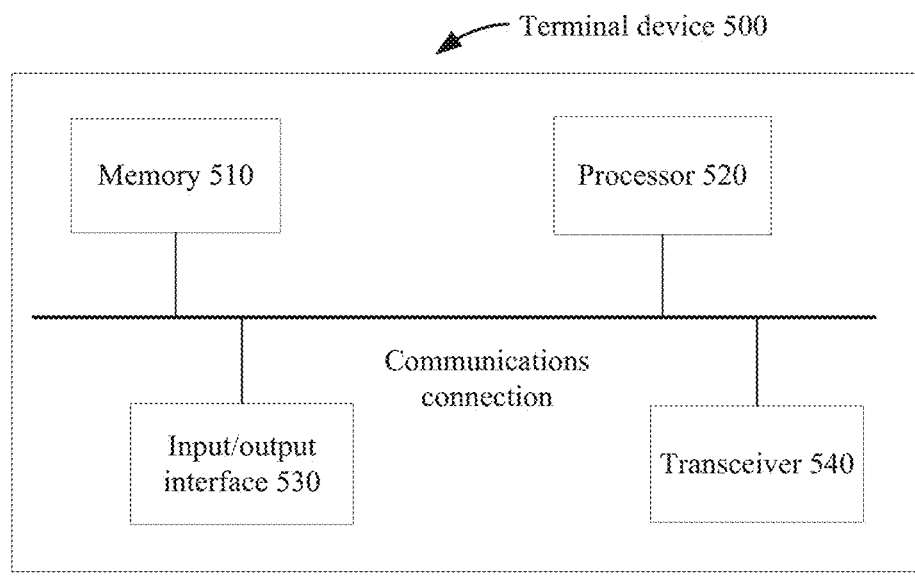
FIG. 5 is a schematic block diagram of a transmission apparatus according to another embodiment of this application.

In an optional embodiment, the receiving unit 310 may be a transceiver 540, the processing unit 320 may be a processor 520, and the communications apparatus may further include an input/output interface 530 and a memory 510, specifically as shown in FIG. 5.

FIG. 5 is a schematic block diagram of a terminal device according to another embodiment of this application. The terminal device can perform all the methods in the foregoing embodiments; therefore, for specific details, refer to descriptions in the foregoing embodiments. Details are not described herein again to avoid repetition. The terminal device 500 shown in FIG. 5 may include: a memory 510, a processor 520, an input/output interface 530, and a transceiver 540. The memory 510, the processor 520, the input/output interface 530, and the transceiver 540 are connected to each other by using an internal connection path. The memory 510 is configured to store an instruction. The processor 520 is configured to execute the instruction stored in the memory 510, to control the input/output interface 530 to receive data and information that are input, and output data such as an operation result, and to control the transceiver 540 to send a signal.

The transceiver 540 is configured to receive indication information.

The processor 520 is configured to determine, based on the indication information received by the transceiver 540, a second precoding matrix set from a first precoding matrix set whose rank is R.

Each precoding matrix W in the first precoding matrix set satisfies $W = W_1 \times W_2$, W is a matrix of $N_t$ rows and R columns, $N_t$ is greater than or equal to R, $W_1$ satisfies $$W_1 = \begin{bmatrix} X & 0 \\ 0 & X \end{bmatrix},$$

$X = [b_{k_0} \ldots b_{k_{M-1}}]$, $b_{k_i}$ is an $N_t/2 \times 1$ vector, $b_{k_i}$ belongs to a vector set $B = \{b_0, b_1, \ldots, b_{T-1}\}$, T is a quantity of vectors in B, $T \geq M$, T is an integer, $W_2$ is a matrix of 2M rows and R columns, an element $W_2(x,y)$ in row x and column y of $W_2$ satisfies $W_2(x,y) = p_{0,y-1,x-1}^0 \times p_{0,y-1,x-1}^1 \times p_{0,y-1,x-1}^2$, an element $W_2(x+M,y)$, in row x+M and column y of $W_2$ satisfies $W_2(x+M,y) = p_{1,y-1,x-1}^0 \times p_{1,y-1,x-1}^1 \times p_{1,y-1,x-1}^2$, $p_{z,y-1,x-1}^0$ is a first product factor, $p_{z,y-1,x-1}^1$ is a second product factor, $p_{z,y-1,x-1}^2$ is a third product factor, $0 < x \leq M$, $0 < y \leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1.

The indication information includes indication information of S sets $D_0$ to $D_{S-1}$, $D_0$ to $D_{S-1}$ are respectively in one-to-one correspondence with $c_0$ to $c_{S-1}$ in a vector set $C = \{c_0, c_1, \ldots, c_{S-1}\}$, any vector $c_j$ in C belongs to B, $D_j$ is a proper subset of $A_0$, $S-1 \geq j \geq 0$, and j is an integer.

The second precoding matrix set is a proper subset of the first precoding matrix set, and the second precoding matrix set does not include $W = W_1 \times W_2$ that satisfies the following condition in the first precoding matrix set:

an $x^{th}$ column vector included in X of $W_1$ is the vector $c_j$, and a first product factor $p_{z,y-1,x-1}^0$ of at least one of elements in row x and row x+M of $W_2$ belongs to $D_j$.

It should be understood that, in this embodiment of this application, the processor 520 may use a general-purpose central processing unit (CPU), a microprocessor, an application-specific integrated circuit (ASIC), or one or more integrated circuits to execute a related program to implement the technical solutions provided in this embodiment of this application.

It should be further understood that the transceiver 540 is also referred to as a communications interface, and uses a transceiver apparatus, for example but not limited to a transceiver, to implement communication between the terminal device 500 and another device or a communications network.

The memory 510 may include a read-only memory and a random access memory, and provides the processor 520 with data and an instruction. A part of the processor 520 may further include a non-volatile random access memory. For example, the processor 520 may further store device type information.

During implementation, the steps in the foregoing methods may be completed by an integrated logic circuit of hardware in the processor 520 or by an instruction in a software form. The methods for determining a precoding matrix set disclosed in the embodiments of this application may be directly embodied as being executed by a hardware processor, or executed by a combination of hardware of a processor and a software module. The software module may be located in a mature storage medium in the art, such as a random access memory, a flash memory, a read-only memory, a programmable read-only memory or an electrically erasable programmable memory, or a register. The storage medium is located in the memory 510. The processor 520 reads information in the memory 510, to complete the steps of the methods in combination with hardware of the processor 520. Details are not described herein again to avoid repetition.

It should be understood that, in this embodiment of this application, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

Figure 6:
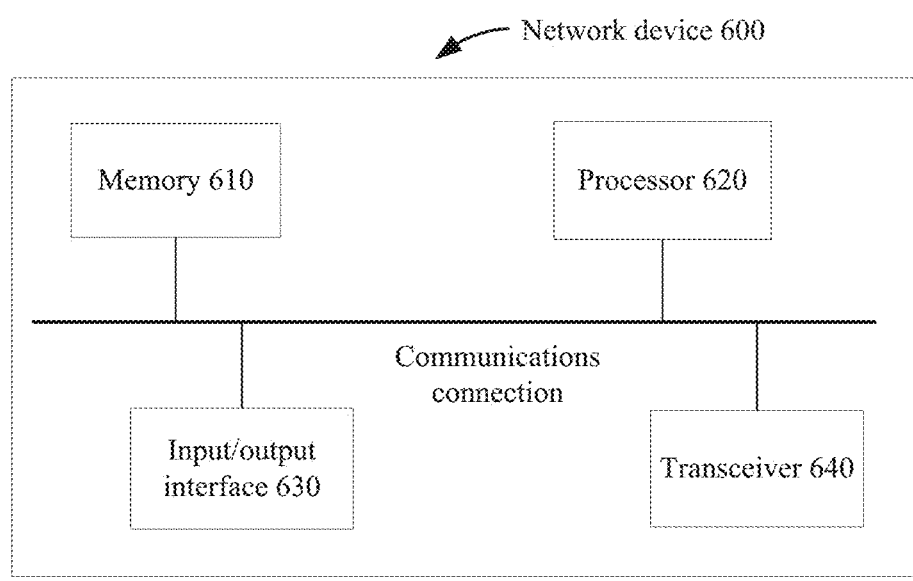
FIG. 6 is a schematic block diagram of a transmission apparatus according to still another embodiment of this application.

In an optional embodiment, the sending unit 420 may be a transceiver 640, the processing unit 410 may be a processor 620, and the communications apparatus may further include an input/output interface 630 and a memory 610, specifically as shown in FIG. 6.

FIG. 6 is a schematic block diagram of a network device according to another embodiment of this application. The network device can perform all the methods in the foregoing embodiments; therefore, for specific details, refer to descriptions in the foregoing embodiments. Details are not described herein again to avoid repetition. The network device 600 shown in FIG. 6 may include: a memory 610, a processor 620, an input/output interface 630, and a transceiver 640. The memory 610, the processor 620, the input/output interface 630, and the transceiver 640 are connected to each other by using an internal connection path. The memory 610 is configured to store an instruction. The processor 620 is configured to execute the instruction stored in the memory 610, to control the input/output interface 630 to receive data and information that are input, and output data such as an operation result, and to control the transceiver 640 to send a signal.

The processor 620 is configured to generate indication information, where the indication information is used by a terminal device to determine a second precoding matrix set from a first precoding matrix set whose rank is R.

The transceiver 640 is configured to send the indication information generated by the processor.

Each precoding matrix W in the first precoding matrix set satisfies $W=W_1 \times W_2$, W is a matrix of $N_t$ rows and R columns, $N_t$ is greater than or equal to R, $W_1$ satisfies $$W_1 = \begin{bmatrix} X & 0 \\ 0 & X \end{bmatrix},$$

$X=[b_{k_0} \ldots b_{k_{M-1}}]$, $b_{k_i}$ is an $N_t/2 \times 1$ vector, $b_{k_i}$ belongs to a vector set $B=\{b_0, b_1, \ldots b_{T-1}\}$, T is a quantity of vectors in B, $T \geq M$, T is an integer, $W_2$ is a matrix of 2M rows and R columns, an element $W_2(x,y)$ in row x and column y of $W_2$ satisfies $W_2(x,y)=p_{0,y-1,x-1}^0 \times p_{0,y-1,x-1}^1 \times p_{0,y-1,x-1}^2$, an element $W_2(x+M,y)$ in row x+M and column y of $W_2$ satisfies $W_2(x+M,y)=p_{1,y-1,x-1}^0 \times p_{1,y-1,x-1}^1 \times p_{1,y-1,x-1}^2$, $p_{z,y-1,x-1}^0$ is a first product factor, $p_{z,y-1,x-1}^1$ is a second product factor, $p_{z,y-1,x-1}^2$ is a third product factor, $0 < x \leq M$, $0 < y \leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1.

The indication information includes indication information of S sets $D_0$ to $D_{S-1}$, $D_0$ to $D_{S-1}$ are respectively in one-to-one correspondence with $c_0$ to $c_{S-1}$ in a vector set $C=\{c_0, c_1, \ldots, c_{S-1}\}$, any vector $c_j$ in C belongs to B, $D_j$ is a proper subset of $A_0$, $S-1 \geq j \geq 0$, and j is an integer.

The second precoding matrix set is a proper subset of the first precoding matrix set, and the second precoding matrix set does not include $W=W_1 \times W_2$ that satisfies the following condition in the first precoding matrix set:

an $x^{th}$ column vector included in X of $W_1$ is the vector $c_j$, and a first product factor $p_{z,y-1,x-1}^0$ of at least one of elements in row x and row x+M of $W_2$ belongs to $D_j$.

It should be understood that, in this embodiment of this application, the processor 620 may use a general-purpose central processing unit (CPU), a microprocessor, an application-specific integrated circuit (ASIC), or one or more integrated circuits to execute a related program to implement the technical solutions provided in this embodiment of this application.

It should be further understood that the transceiver 640 is also referred to as a communications interface, and uses a transceiver apparatus, for example but not limited to a transceiver, to implement communication between the terminal 600 and another device or a communications network.

The memory 610 may include a read-only memory and a random access memory, and provides the processor 620 with data and an instruction. A part of the processor 620 may further include a non-volatile random access memory. For example, the processor 620 may further store device type information.

During implementation, the steps in the foregoing methods may be completed by an integrated logic circuit of hardware in the processor 620 or by an instruction in a software form. The methods for determining a precoding matrix set disclosed in the embodiments of this application may be directly embodied as being executed by a hardware processor, or executed by a combination of hardware of a processor and a software module. The software module may be located in a mature storage medium in the art, such as a random access memory, a flash memory, a read-only memory, a programmable read-only memory or an electrically erasable programmable memory, or a register. The storage medium is located in the memory 610. The processor 620 reads information in the memory 610, to complete the steps of the methods in combination with hardware of the processor 620. Details are not described herein again to avoid repetition.

It should be understood that, in this embodiment of this application, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, hut it should not be considered that the implementation goes beyond the scope of this application.

It may be clearly understood by a person skilled in the art that, for the purpose of convenient and brief description, for a detailed working process of each foregoing system, apparatus, or unit, reference may be made to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, an optical disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
a processor;
a memory, configured to store at least one computer instruction which, when executed by the processor, caused the processor to perform following operations:
receiving, indication information of S sets $D_0$ to $D_{S-1}$, wherein each member of the S sets $D_0$ to $D_{S-1}$ corresponds to a respective element in a vector set $C=\{c_0, c_1, \ldots, c_{S-1}\}$; and
determining, a second precoding matrix set from a first precoding matrix set whose rank is R based on the indication information, wherein:
each precoding matrix W in the first precoding matrix set satisfies $W=W_1 \times W_2$, W is a matrix of $N_t$ rows and R columns, $N_t$ is greater than or equal to R;
$W_1$ satisfies $$W_1 = \begin{bmatrix} X & 0 \\ 0 & X \end{bmatrix},$$

$X=[b_{k_0} \ldots b_{k_{M-1}}]$, $b_k$ is a vector that has a length of $N_t/2$ and that belongs to a vector set $B=\{b_0, b_1, \ldots, b_{T-1}\}$, T is a quantity of vectors in B, $T \geq M$;
$W_2$ is a matrix of 2M rows and R columns, an element $W_2(x,y)$ in row x and column y of $W_2$ satisfies $W_2(x,y)=p_{0,y-1,x-1}^0 \times p_{0,y-1,x-1}^1 \times p_{0,y-1,x-1}^2$, and an element $W_2(x+M,y)$ in row x+M and column y of $W_2$ satisfies $W_2(x+M,y)=p_{1,y-1,x-1}^0 \times p_{1,y-1,x-1}^1 \times p_{1,y-1,x-1}^2$, wherein $p_{z,y-1,x-1}^0$ is a first product factor, $p_{z,y-1,x-1}^1$ is a second product factor, $p_{z,y-1,x-1}^2$ is a third product factor, wherein $0<x \leq M$, $0<y \leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1;
any vector $c_j$ in C belongs to B, $D_j$ is a proper subset of $A_0$, $S-1 \geq j \geq 0$, and j is an integer; and
the second precoding matrix set is a proper subset of the first precoding matrix set, and none of precoding matrices $W=W_1 \times W_2$ in the first precoding matrix set that satisfies the following condition is included in the second precoding matrix set:
an $x^{th}$ column vector comprised in X of $W_1$ is the vector $c_j$, and a first product factor $p_{z,y-1,x-1}^0$ of at least one of elements in row x and row x+M of $W_2$ belongs to $D_j$.

2. The apparatus according to claim 1, wherein the indication information of the S sets $D_0$ to $D_{S-1}$ comprises S bit fields, the S bit fields are in one-to-one correspondence with $D_0$ to $D_{S-1}$, each bit field comprises at least one bit, a bit field corresponding to $D_j$ indicates an element $g_j$ of $A_0$, and any element of $D_j$ is greater than $g_j$.

3. The apparatus according to claim 1, wherein any vector $c_j$ of C and a corresponding element $D_j(v)$ of $D_j$ satisfy the following condition:

$$|D_j(v) \times (b_{f_h})^H \times c_j| > k_h$$

wherein $b_{f_h}$ is a vector of B, $k_h \geq 0$, $k_h$ is a real number, $H \geq h \geq 1$, $T-1 \geq f_h \geq 0$, $H \geq 1$, and H is an integer.

4. The apparatus according to claim 1, wherein C comprises at least M mutually orthogonal vectors, and any mutually M orthogonal vectors $c_{j_0}$, $c_{j_1}$, ..., $c_{j_{M-1}}$ and corresponding elements $D_{j_0}(v_0)$, $D_{j_1}(v_1)$, ..., $D_{j_{M-1}}(v_{M-1})$ satisfy the following condition:

$$\frac{|D_{j_0}(v_0) \times (b_{f_h})^H \times c_{j_0}|^2 + |D_{j_1}(v_1) \times (b_{f_h})^H \times c_{j_1}|^2 + \dots + |D_{j_{M-1}}(v_{M-1}) \times (b_{f_h})^H \times c_{j_{M-1}}|^2}{|D_{j_0}(v_0)|^2 + |D_{j_1}(v_1)|^2 + \dots + |D_{j_{M-1}}(v_{M-1})|^2} > k_h$$

wherein $D_{j_0}(v_0)$, $D_{j_1}(v_1)$, ..., $D_{j_{M-1}}(v_{M-1})$ are elements of sets $D_{j_0}$, $D_{j_1}$, ..., $D_{j_{M-1}}$, respectively, $b_{f_h}$ is a vector of B, $k_h \geq 0$, $k_h$ is a real number, $H \geq h \geq 1$, $T-1 \geq f_h \geq 0$, $H \geq 1$, and H is an integer.

5. The apparatus according to claim 4, wherein the indication information of the S sets $D_0$ to $D_{S-1}$ comprises H bit fields, and an $h^{th}$ bit field indicates $k_h$.

6. A non-transitory computer readable storage medium storing computer instructions, that when executed by one or more hardware processors, cause a computer to perform operations comprising:

receiving, indication information of S sets $D_0$ to $D_{S-1}$, wherein each member of the S sets $D_0$ to $D_{S-1}$ corresponds to a respective element in a vector set $C=\{c_0, c_1, \ldots, c_{S-1}\}$; and determining, a second precoding matrix set from a first precoding matrix set whose rank is R based on the indication information, wherein:

each precoding matrix W in the first precoding matrix set satisfies $W=W_1 \times W_2$, W is a matrix of $N_t$ rows and R columns, $N_t$ is greater than or equal to R;

$W_1$ satisfies $$W_1 = \begin{bmatrix} X & 0 \\ 0 & X \end{bmatrix},$$

$X=[b_{k_0} \ldots b_{k_{M-1}}]$, $b_{k_i}$ is a vector that has a length of $N_t/2$ and that belongs to a vector set $B=\{b_0, b_1, \ldots, b_{T-1}\}$, T is a quantity of vectors in B, $T \geq M$;

$W_2$ is a matrix of 2M rows and R columns, an element $W_2(x,y)$ in row x and column y of $W_2$ satisfies $W_2(x,y)=p_{0,y-1,x-1}^0 \times p_{0,y-1,x-1}^1 \times p_{0,y-1,x-1}^2$, and an element $W_2(x+M,y)$ in row x+M and column y of $W_2$ satisfies $W_2(x+M,y)=p_{1,y-1,x-1}^0 \times p_{1,y-1,x-1}^1 \times p_{1,y-1,x-1}^2$, wherein $p_{z,y-1,x-1}^0$ is a first product factor, $p_{z,y-1,x-1}^1$ is a second product factor, $p_{z,y-1,x-1}^2$ is a third product factor, wherein $0<x \leq M$, $0<y \leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1; any vector $c_j$ in C belongs to B, $D_j$ is a proper subset of $A_0$, $S-1 \geq j \geq 0$, and j is an integer; and the second precoding matrix set is a proper subset of the first precoding matrix set, and none of precoding matrices $W=W_1 \times W_2$ in the first precoding matrix set that satisfies the following condition is included in the second precoding matrix set:

an $x^{th}$ column vector comprised in X of $W_1$ is the vector $c_j$, and a first product factor $p_{z,y-1,x-1}^0$ of at least one of elements in row x and row x+M of $W_2$ belongs to $D_j$.

7. The computer readable storage medium according to claim 6, wherein the indication information of the S sets $D_0$ to $D_{S-1}$ comprises S bit fields, the S bit fields are in one-to-one correspondence with $D_0$ to $D_{S-1}$, each bit field comprises at least one bit, a bit field corresponding to $D_j$ indicates an element $g_j$ of $A_0$, and any element of $D_j$ is greater than $g_j$.

8. The computer readable storage medium according to claim 6, wherein any vector $c_j$ of C and a corresponding element $D_j(v)$ of $D_j$ satisfy the following condition:

$$|D_j(v) \times (b_{f_h})^H \times c_j| > k_h$$

wherein $b_{f_h}$ is a vector of B, $k_h \geq 0$, $k_h$ is a real number, $H \geq h \geq 1$, $T-1 \geq f_h \geq 0$, $H \geq 1$, and H is an integer.

9. The computer readable storage medium according to claim 6, wherein C comprises at least M mutually orthogonal vectors, and any mutually M orthogonal vectors $c_{j_0}$, $c_{j_1}$, ..., $c_{j_{M-1}}$, and corresponding elements $D_{j_0}(v_0)$, $D_{j_1}(v_1)$, ..., $D_{j_{M-1}}(v_{M-1})$ satisfy the following condition:

$$\frac{|D_{j_0}(v_0) \times (b_{f_h})^H \times c_{j_0}|^2 + |D_{j_1}(v_1) \times (b_{f_h})^H \times c_{j_1}|^2 + \dots + |D_{j_{M-1}}(v_{M-1}) \times (b_{f_h})^H \times c_{j_{M-1}}|^2}{|D_{j_0}(v_0)|^2 + |D_{j_1}(v_1)|^2 + \dots + |D_{j_{M-1}}(v_{M-1})|^2} > k_h$$

wherein $D_{j_0}(v_0)$, $D_{j_1}(v_1)$, ..., $D_{j_{M-1}}(v_{M-1})$ are elements of sets $D_{j_0}$, $D_{j_1}$, ..., $D_{j_{M-1}}$ respectively, $b_{f_h}$ is a vector of B, $k_h \geq 0$, $k_h$ is a real number, $H \geq h \geq 1$, $T-1 \geq f_h \geq 0$, $H \geq 1$, and H is an integer.

10. The computer readable storage medium according to claim 9, wherein the indication information of the S sets $D_0$ to $D_{S-1}$ comprises H bit fields, and an $h^{th}$ bit field indicates $k_h$.

11. A method, comprising:

receiving, at a communication device, indication information of S sets $D_0$ to $D_{S-1}$, wherein each member of the S sets $D_0$ to $D_{S-1}$ corresponds to a respective element in a vector set $C=\{c_0, c_1, \ldots, c_{S-1}\}$; and determining a second precoding matrix set from a first precoding matrix set whose rank is R based on the indication information, wherein:

each precoding matrix W in the first precoding matrix set satisfies $W=W_1 \times W_2$, W is a matrix of $N_t$ rows and R columns, $N_t$ is greater than or equal to R;

$W_1$ satisfies $$W_1 = \begin{bmatrix} X & 0 \\ 0 & X \end{bmatrix},$$

$X=[b_{k_0} \ldots b_{k_{M-1}}]$, $b_{k_i}$ is a vector that has a length of $Nt/2$ and that belongs to a vector set $B=\{b_0, b_1, \ldots, b_{T-1}\}$, T is a quantity of vectors in B, $T \geq M$;

$W_2$ is a matrix of 2M rows and R columns, an element $W_2(x,y)$ in row x and column y of $W_2$ satisfies $W_2(x,y)=p_{0,y-1,x-1}^0 \times p_{0,y-1,x-1}^1 \times p_{0,y-1,x-1}^2$, and an element $W_2(x+M,y)$ in row x+M and column y of $W_2$ satisfies $W_2(x+M,y)=p_{1,y-1,x-1}^0 \times p_{1,y-1,x-1}^1 \times p_{1,y-1,x-1}^2$, wherein $p_{z,y-1,x-1}^0$ is a first product factor, $p_{z,y-1,x-1}^1$ is a second product factor, $p_{z,y-1,x-1}^2$ is a third product factor, wherein $0<x \leq M$, $0<y \leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \leq p_{z,y-1,x-1}^1 > 0$, $p_{z,y-1,x-1}^1$ is a real number, and $p_{z,y-1,x-1}^2$ is a complex number whose modulus is 1;

any vector $c_j$ in C belongs to B, $D_j$ is a proper subset of $A_0$, S−1≥j≥0, and j is an integer; and the second precoding matrix set is a proper subset of the first precoding matrix set, and none of precoding matrices W=$W_1$×$W_2$ in the first precoding matrix set that satisfies the following condition is included in the second precoding matrix set:

an $x^{th}$ column vector comprised in X of $W_1$ is the vector $c_j$, and a first product factor $p_{z,y\text{-}1,x\text{-}1}^0$ of at least one of elements in row x and row x+M of $W_2$ belongs to $D_j$.

12. The method according to claim 11, wherein the indication information of the S sets $D_0$ to $D_{S\text{-}1}$ comprises S bit fields, the S bit fields are in one-to-one correspondence with $D_0$ to $D_{S\text{-}1}$, each bit field comprises at least one bit, a bit field corresponding to $D_j$ indicates an element $g_j$ of $A_0$, and any element of $D_j$ is greater than $g_j$.

13. The method according to claim 11, wherein any vector $c_j$ of C and a corresponding element $D_j(v)$ of $D_j$ satisfy the following condition:

$$|D_j(v) \times (b_{f_h})^H \times c_j| > k_h$$

wherein $b_{f_h}$ is a vector of B, $k_h \geq 0$, $k_h$ is a real number, H≥h≥1, T−1≥$f_h$≥0, H≥1, and H is an integer.

14. The method according to claim 11, wherein C comprises at least M mutually orthogonal vectors, and any mutually M orthogonal vectors $c_{j_0}$, $c_{j_1}$, ..., $c_{j_{M\text{-}1}}$, and corresponding elements $D_{j_0}(v_0)$, $D_{j_1}(v_1)$, ..., $D_{j_{M\text{-}1}}(v_{M\text{-}1})$ satisfy the following condition:

$$\frac{|D_{j_0}(v_0) \times (b_{f_h})^H \times c_{j_0}|^2 + |D_{j_1}(v_1) \times (b_{f_h})^H \times c_{j_1}|^2 + \ldots + |D_{j_{M\text{-}1}}(v_{M\text{-}1}) \times (b_{f_h})^H \times c_{j_{M\text{-}1}}|^2}{|D_{j_0}(v_0)|^2 + |D_{j_1}(v_1)|^2 + \ldots + |D_{j_{M\text{-}1}}(v_{M\text{-}1})|^2} > k_h$$

wherein $D_{j_0}(v_0)$, $D_{j_1}(v_1)$, ..., $D_{j_{M\text{-}1}}(v_{M\text{-}1})$ are elements of sets $D_{j_0}$, $D_{j_1}$, ..., $D_{j_{M\text{-}1}}$ respectively, $b_{f_h}$ is a vector of B, $k_h \geq 0$, $k_h$ is a real number, H≥h≥1, T−1≥$f_h$≥0, H≥1, and H is an integer.

15. The method according to claim 14, wherein the indication information of the S sets $D_0$ to $D_{S\text{-}1}$ comprises H bit fields, and an $h^{th}$ bit field indicates $k_h$.

16. A communication apparatus, comprising:
a processor;
a memory, configured to store at least one computer instruction which, when executed by the processor, caused the processor to perform following operations:
generating, indication information of S sets $D_0$ to $D_{S\text{-}1}$, wherein each member of the S sets $D_0$ to $D_{S\text{-}1}$ corresponds to a respective element in a vector set C={$c_0$, $c_1$, ..., $c_{S\text{-}1}$}, and the indication information is used by a terminal device to determine a second precoding matrix set from a first precoding matrix set whose rank is R; and
sending, the indication information;
wherein each precoding matrix W in the first precoding matrix set satisfies W=$W_1$×$W_2$, W is a matrix of $N_t$ rows and R columns, $N_t$ is greater than or equal to R; $W_1$ satisfies $$W_1 = \begin{bmatrix} X & 0 \\ 0 & X \end{bmatrix},$$

X=[$b_{k_0}$ ... $b_{k_{M\text{-}1}}$], $b_{k_i}$ is a vector that has a length of $N_t/2$ and that belongs to a vector set B={$b_0$, $b_1$, ..., $b_{T\text{-}1}$}, T is a quantity of vectors in B, T≥M;

$W_2$ is a matrix of 2M rows and R columns, an element $W_2(x,y)$ in row x and column y of $W_2$ satisfies $W_2(x,y)=p_{0,y\text{-}1,x\text{-}1}^0 \times p_{0,y\text{-}1,x\text{-}1}^1 \times p_{0,y\text{-}1,x\text{-}1}^2$, and an element $W_2(x+M,y)$ in row x+M and column y of $W_2$ satisfies $W_2(x+M,y)=p_{1,y\text{-}1,x\text{-}1}^0 \times p_{1,y\text{-}1,x\text{-}1}^1 \times p_{1,y\text{-}1,x\text{-}1}^2$, wherein $p_{z,y\text{-}1,x\text{-}1}^0$ is a first product factor, $p_{z,y\text{-}1,x\text{-}1}^1$ is a second product factor, $p_{z,y\text{-}1,x\text{-}1}^2$ is a third product factor, wherein 0<x≤M, 0<y≤R, a value range of $p_{z,y\text{-}1,x\text{-}1}^0$ is a set $A_0$, z belongs to {0,1}, 1≥$p_{z,y\text{-}1,x\text{-}1}^0$≥0, $p_{z,y\text{-}1,x\text{-}1}^0$ is a real number, 1≥$p_{z,y\text{-}1,x\text{-}1}^1$≥0, $p_{z,y\text{-}1,x\text{-}1}^1$ is a real number, and $p_{z,y\text{-}1,x\text{-}1}^2$ is a complex number whose modulus is 1;

any vector $c_j$ in C belongs to B, $D_j$ is a proper subset of $A_0$, S−1≥j≥0, and j is an integer; and the second precoding matrix set is a proper subset of the first precoding matrix set, and none of precoding matrices W=$W_1$×$W_2$ in the first precoding matrix set that satisfies the following condition is included in the second precoding matrix set:

an $x^{th}$ column vector comprised in X of $W_1$ is the vector $c_j$, and a first product factor $p_{z,y\text{-}1,x\text{-}1}^0$ of at least one of elements in row x and row x+M of $W_2$ belongs to $D_j$.

17. A method for determining a precoding matrix set, comprising:
generating, indication information of S sets $D_0$ to $D_{S\text{-}1}$, wherein each member of the S sets $D_0$ to $D_{S\text{-}1}$ corresponds to a respective element in a vector set C={$c_0$, $c_1$, ..., $c_{S\text{-}1}$}, and the indication information is used to determine a second precoding matrix set from a first precoding matrix set whose rank is R; and
sending, the indication information to a terminal device;
wherein each precoding matrix W in the first precoding matrix set satisfies W=$W_1$×$W_2$, W is a matrix of $N_t$ rows and R columns, $N_t$ is greater than or equal to R; $W_1$ satisfies $$W_1 = \begin{bmatrix} X & 0 \\ 0 & X \end{bmatrix},$$

X=[$b_{k_0}$ ... $b_{k_{M\text{-}1}}$], $b_{k_i}$ is a vector that has a length of $N_t/2$ and that belongs to a vector set B={$b_0$, $b_1$, ..., $b_{T\text{-}1}$}, T is a quantity of vectors in B, T≥M;

$W_2$ is a matrix of 2M rows and R columns, an element $W_2(x,y)$ in row x and column y of $W_2$ satisfies $W_2(x,y)=p_{0,y\text{-}1,x\text{-}1}^0 \times p_{0,y\text{-}1,x\text{-}1}^1 \times p_{0,y\text{-}1,x\text{-}1}^2$, and an element $W_2(x+M,y)$ in row x+M and column y of $W_2$ satisfies $W_2(x+M,y)=p_{1,y\text{-}1,x\text{-}1}^0 \times p_{1,y\text{-}1,x\text{-}1}^1 \times p_{1,y\text{-}1,x\text{-}1}^2$, wherein $p_{z,y\text{-}1,x\text{-}1}^0$ is a first product factor, $p_{z,y\text{-}1,x\text{-}1}^1$ is a second product factor, $p_{z,y\text{-}1,x\text{-}1}^2$ is a third product factor, wherein 0<x≤M, 0<y≤R, a value range of $p_{z,y\text{-}1,x\text{-}1}^0$ is a set $A_0$, z belongs to {0,1}, 1≥$p_{z,y\text{-}1,x\text{-}1}^0$≥0, $p_{z,y\text{-}1,x\text{-}1}^0$ is a real number, 1≥$p_{z,y\text{-}1,x\text{-}1}^1$≥0, $p_{z,y\text{-}1,x\text{-}1}^1$ is a real number, and $p_{z,y\text{-}1,x\text{-}1}^2$ is a complex number whose modulus is 1;

any vector $c_j$ in C belongs to B, $D_j$ is a proper subset of $A_0$, S−1≥j≥0, and j is an integer; and the second precoding matrix set is a proper subset of the first precoding matrix set, and none of precoding matrices W=$W_1$×$W_2$ in the first precoding matrix set that satisfies the following condition is included in the second precoding matrix set:

an $x^{th}$ column vector comprised in X of $W_1$ is the vector $c_j$, and a first product factor $p_{z,y\text{-}1,x\text{-}1}^0$ of at least one of elements in row x and row x+M of $W_2$ belongs to $D_j$.

18. A communication apparatus, comprising:
a processor, configured to generate indication information of S sets $D_0$ to $D_{S-1}$, wherein each member of the S sets $D_0$ to $D_{S-1}$ corresponds to a respective element in a vector set $C=\{c_0, c_1, \ldots, c_{S-1}\}$, and the indication information is used to determine a second precoding matrix set from a first precoding matrix set whose rank is R; and
a transceiver, configured to send the indication information to a terminal device;
wherein each precoding matrix W in the first precoding matrix set satisfies $W=W_1 \times W_2$, W is a matrix of $N_t$ rows and R columns, $N_t$ is greater than or equal to R; $W_1$ satisfies $$W_1 = \begin{bmatrix} X & 0 \\ 0 & X \end{bmatrix},$$

$X=[b_{k_0} \ldots b_{k_{M-1}}]$, $b_{k_i}$ is a vector that has a length of $N_t/2$ and that belongs to a vector set $B=\{b_0, b_1, \ldots, b_{T-1}\}$, T is a quantity of vectors in B, $T \geq M$;
$W_2$ is a matrix of 2M rows and R columns, an element $W_2(x,y)$ in row x and column y of $W_2$ satisfies $W_2(x,y)=p_{0,y-1,x-1}^0 \times p_{0,y-1,x-1}^1 \times p_{0,y-1,x-1}^2$, and an element $W_2(x+M,y)$ in row x+M and column y of $W_2$ satisfies $W_2(x+M,y)=p_{1,y-1,x-1}^0 \times p_{1,y-1,x-1}^1 \times p_{1,y-1,x-1}^2$, wherein $p_{z,y-1,x-1}^0$ is a first product factor, $p_{z,y-1,x-1}^1$ is a second product factor, $p_{z,y-1,x-1}^2$ is a third product factor, wherein $0<x \leq M$, $0<y \leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1;
any vector $c_j$ in C belongs to B, $D_j$ is a proper subset of $A_0$, $S-1 \geq j \geq 0$, and j is an integer; and
the second precoding matrix set is a proper subset of the first precoding matrix set, and none of precoding matrices $W=W_1 \times W_2$ in the first precoding matrix set that satisfies the following condition is included in the second precoding matrix set:
an $x^{th}$ column vector comprised in X of $W_1$ is the vector $c_j$, and a first product factor $p_{z,y-1,x-1}^0$ of at least one of elements in row x and row x+M of $W_2$ belongs to $D_j$.

19. A non-transitory computer readable storage medium storing computer instructions, that when executed by one or more hardware processors, cause a computer to perform operations comprising:
generating, indication information of S sets $D_0$ to $D_{S-1}$, wherein each member of the S sets $D_0$ to $D_{S-1}$ corresponds to a respective element in a vector set $C=\{c_0, c_1, \ldots, c_{S-1}\}$, and the indication information is used to determine a second precoding matrix set from a first precoding matrix set whose rank is R; and
sending, the indication information to a terminal device;
wherein each precoding matrix W in the first precoding matrix set satisfies $W=W_1 \times W_2$, W is a matrix of $N_t$ rows and R columns, $N_t$ is greater than or equal to R; $W_1$ satisfies $$W_1 = \begin{bmatrix} X & 0 \\ 0 & X \end{bmatrix},$$

$X=[b_{k_0} \ldots b_{k_{M-1}}]$, $b_{k_i}$ is a vector that has a length of $N_t/2$ and that belongs to a vector set $B=\{b_0, b_1, \ldots, b_{T-1}\}$, T is a quantity of vectors in B, $T \geq M$;
$W_2$ is a matrix of 2M rows and R columns, an element $W_2(x,y)$ in row x and column y of $W_2$ satisfies $W_2(x,y)=p_{0,y-1,x-1}^0 \times p_{0,y-1,x-1}^1 \times p_{0,y-1,x-1}^2$, and an element $W_2(x+M,y)$ in row x+M and column y of $W_2$ satisfies $W_2(x+M,y)=p_{1,y-1,x-1}^0 \times p_{1,y-1,x-1}^1 \times p_{1,y-1,x-1}^2$, wherein $p_{z,y-1,x-1}^0$ is a first product factor, $p_{z,y-1,x-1}^1$ is a second product factor, $p_{z,y-1,x-1}^2$ is a third product factor, wherein $0<x \leq M$, $0<y \leq R$, a value range of $p_{z,y-1,x-1}^0$ is a set $A_0$, z belongs to $\{0,1\}$, $1 \geq p_{z,y-1,x-1}^0 \geq 0$, $p_{z,y-1,x-1}^0$ is a real number, $1 \geq p_{z,y-1,x-1}^1 \geq 0$, $p_{z,y-1,x-1}^1$ is a real number, and $p_{z,y-1,x-1}^2$ is a complex number whose modulus is 1;
any vector $c_j$ in C belongs to B, $D_j$ is a proper subset of $A_0$, $S-1 \geq j \geq 0$, and j is an integer; and
the second precoding matrix set is a proper subset of the first precoding matrix set, and none of precoding matrices $W=W_1 \times W_2$ in the first precoding matrix set that satisfies the following condition is included in the second precoding matrix set:
an $x^{th}$ column vector comprised in X of $W_1$ is the vector $c_j$, and a first product factor $p_{z,y-1,x-1}^0$ of at least one of elements in row x and row x+M of $W_2$ belongs to $D_j$.

\* \* \* \* \*

UNITED STATES PATENT AND TRADEMARK OFFICE
CERTIFICATE OF CORRECTION

| | | |
|---|---|---|
| PATENT NO. | : 10,897,293 B2 | Page 1 of 1 |
| APPLICATION NO. | : 16/559354 | |
| DATED | : January 19, 2021 | |
| INVENTOR(S) | : Ruiqi Zhang and Xueru Li | |

It is certified that error appears in the above-identified patent and that said Letters Patent is hereby corrected as shown below:

On the Title Page

In Column 2, in the abstract, Line 7, delete "front" and insert -- from --, therefor.

In the Specification

In Column 1, Line 11, delete "international" and insert -- "International" --, therefor.

In the Claims

In Column 23, Line 17, in Claim 4, delete "$D_{jM-1}$," and insert -- $D_{jM-1}$ --, therefor.

In Column 24, Line 19, in Claim 9, delete "$c_{jM-1}$," and insert -- $c_{jM-1}$ --, therefor.

In Column 24, Line 66, in Claim 11, delete "$1\leq$" and insert -- $1\geq$ --, therefor.

In Column 24, Line 66, in Claim 11, delete ">0," and insert -- $\geq 0$, --, therefor.

In Column 25, Line 28, in Claim 14, delete "$c_{jM-1}$," and insert -- $c_{jM-1}$ --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*